United States Patent
Yang et al.

(10) Patent No.: US 12,052,107 B2
(45) Date of Patent: Jul. 30, 2024

(54) METHOD AND APPARATUS FOR SUPPORTING HARQ RETRANSMISSION IN WIRELESS COMMUNICATION SYSTEM

(71) Applicant: Innovative Technology Lab Co., Ltd., Seoul (KR)

(72) Inventors: Hyo Sun Yang, Seoul (KR); Ki Bum Kwon, Seoul (KR)

(73) Assignee: INNOVATIVE TECHNOLOGY LAB CO., LTD., Seoul (KR)

( * ) Notice: Subject to any disclaimer, the term of this patent is extended or adjusted under 35 U.S.C. 154(b) by 276 days.

(21) Appl. No.: 17/402,163

(22) Filed: Aug. 13, 2021

(65) Prior Publication Data

US 2021/0376959 A1 Dec. 2, 2021

Related U.S. Application Data

(63) Continuation of application No. PCT/KR2020/001872, filed on Feb. 11, 2020.

(30) Foreign Application Priority Data

Feb. 14, 2019 (KR) .................. 10-2019-0017336

(51) Int. Cl.
*H04L 1/1812* (2023.01)
*H04W 4/40* (2018.01)
*H04W 72/23* (2023.01)

(52) U.S. Cl.
CPC ............. *H04L 1/1816* (2013.01); *H04W 4/40* (2018.02); *H04W 72/23* (2023.01)

(58) Field of Classification Search
CPC ........... H04L 1/1816; H04L 2001/0097; H04L 1/1822; H04L 1/1896; H04L 1/1887; H04L 1/189; H04L 1/1812; H04L 1/1854; H04L 1/1864; H04W 4/40; H04W 72/23; H04W 72/12
See application file for complete search history.

(56) References Cited

U.S. PATENT DOCUMENTS

2016/0309501 A1   10/2016  Lee et al.
2017/0347394 A1*  11/2017  Yasukawa ............... H04L 1/189
(Continued)

FOREIGN PATENT DOCUMENTS

KR   1020120033139 A   4/2012
WO      2018160108 A1   9/2018

OTHER PUBLICATIONS

Intel Corporation, "Sidelink physical layer procedures for NR V2X communication", 3GPP TSG RAN WG1 Ad-Hoc Meeting 1901, R1-1900481, Taipei, Taiwan, Jan. 21-25, 2019, pp. 1-19.
(Continued)

*Primary Examiner* — Ashley Shivers

(57) ABSTRACT

The present disclosure provides a method for performing HARQ retransmission by a terminal supporting V2X communication in a wireless communication system. The method for performing HARQ retransmission may comprise the steps of: transmitting data by a transmission terminal in a pre-configured resource; receiving, by the transmission terminal, a NACK response to the data from a reception terminal; and retransmitting the data by the transmission terminal after changing an NDI value based on a resource dynamically allocated from a base station.

21 Claims, 15 Drawing Sheets

(a)

(b)

(56) References Cited

U.S. PATENT DOCUMENTS

| | | | |
|---|---|---|---|
| 2019/0052436 A1* | 2/2019 | Desai | H04L 5/0055 |
| 2020/0029318 A1* | 1/2020 | Guo | H04L 1/1822 |
| 2020/0036485 A1* | 1/2020 | Fröberg Olsson | H04L 5/0055 |
| 2020/0236656 A1* | 7/2020 | Cao | H04W 80/02 |

OTHER PUBLICATIONS

CATT, "CSI report during inactive time", 3GPP TSG-RAN WG2#102 R2-1807002, Busan, Korea, May 21-25, 2018, pp. 1-3.

Extended European Search report for Application No. 20755145.8-1213 / 3926870 PCT/KR2020001872. Dated Sep. 19, 2022.

Examination report under sections 12 & 13 of the Patents Act, 1970 and the Patents Rules, 2003 for Application No. 202117038099, from Intellectual Property India. Dated Sep. 27, 2022.

International Search Report for International Patent Application No. PCT/KR2020/001872, dated May 22, 2020.

Written Opinion for International Patent Application No. PCT/KR2020/001872, dated May 22, 2020.

"3rd Generation Partnership Project; Technical Specification Group Radio Access Network; NR; Multiplexing and channel coding (Release 15)", 3GPP TS 38.212 V15.4.0, Dec. 2018, pp. 1-100, 3GPP Organizational Partners.

"3rd Generation Partnership Project; Technical Specification Group Radio Access Network; NR; Physical layer procedures for control (Release 15)", 3GPP TS 38.213 V15.4.0, Dec. 2018, pp. 1-104, 3GPP Organizational Partners.

"3rd Generation Partnership Project; Technical Specification Group Radio Access Network; NR; Physical layer procedures for data (Release 15)", 3GPP TS 38.214 V15.4.0, Dec. 2018, pp. 1-102, 3GPP Organizational Partners.

"3rd Generation Partnership Project; Technical Specification Group Radio Access Network; NR; NR and NG-RAN Overall Description; Stage 2 (Release 15)", 3GPP TS 38.300 V15.4.0, Dec. 2018, pp. 1-97, 3GPP Organizational Partners.

"3rd Generation Partnership Project; Technical Specification Group Radio Access Network; NR; Medium Access Control (MAC) protocol specification (Release 15)", 3GPP TS 38.321 V15.4.0, Dec. 2018, pp. 1-77, 3GPP Organizational Partners.

CATT, "HARQ Procedure for Mode 1", 3GPP TSG-RAN WG2 Meeting #105, R2-1900218, Athens, Greece, Feb. 25-Mar. 1, 2019.

LG Electronics, "Feature lead summary for agenda item 7.2.4.1.2 Physical layer procedures", 3GPP TSG RAN WG1 Ad-Hoc Meeting 1901, R1-1901439, Taipei, Taiwan, Jan. 21-25, 2019.

Huawei et al., "Sidelink physical layer procedures for NR V2X", 3GPP TSG RAN WG1 Ad-Hoc Meeting 1901, R1-1900023, Taipei, Jan. 21-25, 2019.

3GPP TSG RAN WG1 Ad-Hoc Meeting 1901. R1-1900775 Taipei, Jan. 21-25, 2019 Title: Discussion on PHY procedures for NR V2X Source: ZTE, Sanechips.

* cited by examiner (a)

(b)

Base station scheduling mode (a)

UE autonomous determination mode (b)

METHOD AND APPARATUS FOR SUPPORTING HARQ RETRANSMISSION IN WIRELESS COMMUNICATION SYSTEM

CROSS-REFERENCE TO RELATED APPLICATIONS

This application is a continuation of pending PCT International patent application No. PCT/KR2020/001872, filed on Feb. 11, 2020, which claims priority from and the benefit of Korean Patent Application No. 10-2019-0017336, filed on Feb. 14, 2019, each of which is hereby incorporated by reference in its entirety.

BACKGROUND

1. Field

The present disclosure relates to a method and apparatus for performing, by a user equipment (UE) that supports vehicle-to-everything (V2X) communication in a wireless communication system.

More particularly, the present disclosure relates to a method and apparatus for performing, by a mode 1 UE that supports V2X communication in a wireless communication system, Hybrid Automatic Repeat and Request (HARQ) retransmission in a configured grant.

2. Discussion of the Background

International Mobile Telecommunication (IMT) framework and standard are being developed in the International Telecommunication Union (ITU). Also, in the recent times, discussion for 5-th generation (5G) communication is ongoing through a program called "IMT for 2020 and beyond".

To meet the requirements requested by "IMT for 2020 and beyond", discussion is being made to support various numerologies about a time-frequency resource unit standard by considering various scenarios, service requirements, and potential system compatibility in a 3-rd Generation Partnership Project (3GPP) new radio (NR) system.

In addition, vehicle-to-everything (V2X) communication refers to a communication method of exchanging or sharing road infrastructures during driving and information, such as traffic conditions, through communication with other vehicles. V2X may include, for example, vehicle-to-vehicle (V2V) that refers to long term evolution (LTE)-based communication between vehicles, vehicle-to-pedestrian (V2P) that refers to LTE-based communication between a vehicle and a user equipment (UE) carried by a user, and vehicle-to-infrastructure/network (V2I/N) that refers to LTE-based communication between a vehicle and a roadside unit (RSU)/network. Here, the RSU may be a transportation infrastructure entity configured by a base station or a fixed terminal, such as, for example, an entity that transmits a speed notification to a vehicle. Also, based on performance requirements to support V2X communication through a current 5G system such as an autonomous driving and a remote vehicle control, discussion on technology additionally required for Long Term Evolution (LTE) and a new radio (NR) system that is radio access technology (RAT) in the 5G system is ongoing.

SUMMARY

The present disclosure may provide a method and apparatus for performing, by a user equipment (UE) that supports vehicular communication in a wireless communication system, Hybrid Automatic Repeat and Request (HARQ) retransmission.

The present disclosure may provide a method of meeting, by a UE that supports vehicular communication in a wireless communication system, requirements such as low latency and high reliability.

The present disclosure may provide a method and apparatus for efficiently using, by a UE that supports vehicular communication in a wireless communication system, a configured grant.

To achieve the aforementioned technical subject, the present disclosure may provide a method of performing, by a user equipment (UE) that supports vehicle-to-everything (V2X) communication, Hybrid Automatic Repeat and Request (HARQ) retransmission in a wireless communication system. Here, a method of performing HARQ retransmission may include transmitting, by a transmitting UE (Tx UE), data in a configured grant, receiving, by the Tx UE, a non-acknowledgment (NACK) response to the data from a receiving UE (Rx UE), and changing, by the Tx UE, a new data indicator (NDI) value based on a grant dynamically allocated from a base station and retransmitting the data.

According to the present disclosure, a user equipment (UE) that supports vehicular communication in a wireless communication system may perform Hybrid Automatic Repeat and Request (HARQ) retransmission.

According to the present disclosure, a UE that supports vehicular communication in a wireless communication system may meet requirements such as low latency and high reliability.

According to the present disclosure, a UE that supports vehicular communication in a wireless communication system may efficiently use a configured grant.

Effects achievable from the present disclosure are not limited to the aforementioned effects and still other effects not described herein may be clearly understood by one of ordinary skill in the art to which the present disclosure pertains from the following description.

DETAILED DESCRIPTION

Figure 1:
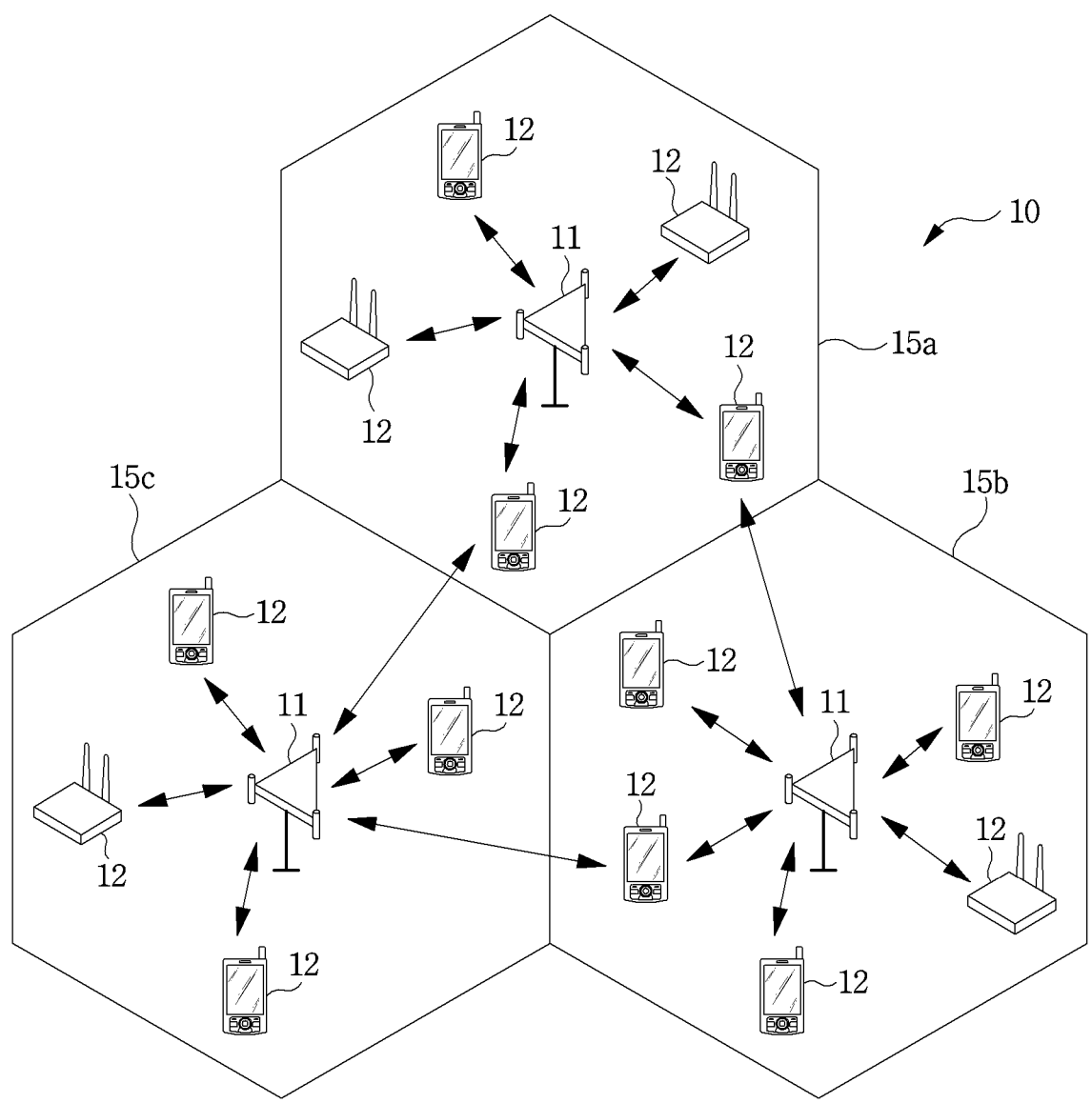
FIG. 1 illustrates a wireless communication system according to the present disclosure.

In a wireless communication system of the present disclosure, a method of performing, by a user equipment (UE) that supports vehicle-to-everything (V2X) communication, Hybrid Automatic Repeat and Request (HARD) retransmission may include transmitting, by a transmitting UE (Tx UE), data in a configured grant, receiving, by the Tx UE, a non-acknowledgment (NACK) response to the data from a receiving UE (Rx UE), and changing, by the Tx UE, a new data indicator (NDI) value based on a grant dynamically allocated from a base station and then retransmitting the data.

Various examples of the present disclosure will be described more fully hereinafter with reference to the accompanying drawings such that one of ordinary skill in the art to which the present disclosure pertains may easily implement the examples. However, the present disclosure may be implemented in various forms and is not limited to the examples described herein.

In describing the examples, detailed description on known configurations or functions may be omitted for clarity and conciseness. Throughout the drawings and the detailed description, unless otherwise described, the same drawing reference numerals are understood to refer to the same elements, features, and structures.

In the present disclosure, it will be understood that when an element is referred to as being "connected to," "coupled to," or "accessed to" another element, it can be directly connected, coupled, or accessed to the other element or intervening elements may be present. Also, it will be further understood that when an element is described to "comprise/include" or "have" another element, it specifies the presence of still another element, but do not preclude the presence of another element uncles otherwise described.

In the present disclosure, the terms, such as first, second, and the like, may be used herein to describe elements in the description herein. The terms are used to distinguish one element from another element. Thus, the terms do not limit the element, an arrangement order, a sequence or the like. Therefore, a first element in an example may be referred to as a second element in another example. Likewise, a second element in an example may be referred to as a first element in another example.

In present disclosure, distinguishing elements are merely provided to clearly explain the respective features and do not represent that the elements are necessarily separate from each other. That is, a plurality of elements may be integrated into a single hardware or software unit. Also, a single element may be distributed to a plurality of hardware or software units. Therefore, unless particularly described, the integrated or distributed example is also included in the scope of the disclosure.

In the present disclosure, elements described in various examples may not be necessarily essential and may be partially selectable. Therefore, an example including a partial set of elements described in an example is also included in the scope of the disclosure. Also, an example that additionally includes another element to elements described in various examples is also included in the scope of the disclosure.

Further, the description described herein is related to a wireless communication network, and an operation performed in the wireless communication network may be performed in a process of controlling a network and transmitting data in a system that controls the wireless communication network (e.g., a base station), or may be performed in a process of transmitting or receiving a signal in a user equipment connected to the wireless communication network.

It is apparent that various operations performed for communication with a terminal in a network including a base station and a plurality of network nodes may be performed by the base station or by other network nodes in addition to the base station. Here, the term 'base station (BS)' may be interchangeably used with other terms, for example, a fixed station, a Node B, eNodeB (eNB), and an access point (AP). Also, the term 'terminal' may be interchangeably used with other terms, for example, user equipment (UE), a mobile station (MS), a mobile subscriber station (MSS), a subscriber station (SS), and a non-AP station (non-AP STA).

In the present disclosure, transmitting or receiving a channel includes a meaning of transmitting or receiving information or a signal through the corresponding channel. For example, transmitting a control channel indicates transmitting control information or a signal through the control channel. Likewise, transmitting a data channel indicates transmitting data information or a signal through the data channel.

In the following description, although the term "new radio (NR) system" is used to distinguish a system according to various examples of the present disclosure from the existing system, the scope of the present disclosure is not limited thereto.

For example, a new radio (NR) system supports various subcarrier spacings (SCSs) by considering various scenarios, service requirements, potential system compatibility, and the like. Also, to overcome a poor channel environment, such as high pathloss, phase-noise, and frequency offset, occurring on a high carrier frequency, the NR system may support transmission of a physical signal/channel through a plurality of beams. Through this, the NR system may support applications, for example, enhanced Mobile Broadband (eMBB), massive Machine Type Communications (mMTC)/ultra Machine Type Communications (uMTC), and Ultra Reliable and Low Latency Communications (URLLC). Here, the term "NR system" used herein is used as an example of a wireless communication system, and the term "NR system" itself is not limited to the aforementioned features.

Also, for example, 5-th generation (5G) mobile communication technology may be defined. Here, 5G mobile communication technology may be defined by including the existing Long Term Evolution-Advanced (LTE-A) system as well as the aforementioned NR system. That is, 5G mobile communication technology may operate by considering backward compatibility with a previous system as well as a newly defined NR system.

For example, a sidelink field of 5G may include all of sidelink technology in an LTE system and sidelink technology in an NR system. Here, the sidelink field may be essential to enhance a performance and to integrate various services through an ultra high reliability and an ultra low latency.

FIG. 1 is a diagram illustrating a wireless communication system to which the present disclosure is applied.

The network structure illustrated in FIG. 1 may be the network structure of NG-RAN(Next Generation Radio Access Network) or Evolved-Universal Mobile Telecommunications System (E-UMTS). NG-RAN or E-UMTS may include the long term evolution (LTE) system, the LTE-A system, or the like, or may include the 5G mobile communication network, new radio (NR), or the like.

Referring to FIG. 1, in a wireless communication system 10, a base station (BS) 11 and a user equipment (UE) 12 may wirelessly perform transmission and reception of data. Also, the wireless communication system 10 may support device-to-device (D2D) communication between UEs. Also, for example, the wireless communication system 10 may support Vehicle-to-everything (V2X) communication. The following may include all of the concept of a terminal device used by a general user and a terminal device mounted to a vehicle, such as, for example, a smartphone for the aforementioned UE.

The BS 11 in the wireless communication system 10 may provide a communication service to a UE placed in the coverage of the BS 11 via a predetermined frequency band. The coverage within which a BS provides a service is also referred to as a site. The site may include various areas 15a, 15b, and 15c, which may be referred to as sectors. The sectors included in the site may be identified by different identifiers. Each sector 15a, 15b, and 15c may be construed as a part of the area that the BS 11 covers.

The BS 11 may generally refer to a station that communicates with the UE 12, and may be referred to as an evolved-NodeB (eNodeB), gNodeB, ng-eNB, a base transceiver system (BTS), an access point, a femtoeNodeB, a home eNodeB (HeNodeB), a relay, a remote radio head (RRH), DU (Distributed Unit) or the like.

The UE 12 may be a stationary or mobile entity, and may be referred to as a mobile station (MS), a mobile terminal (MT), a user terminal (UT), a subscriber station (SS), a wireless device, a personal digital assistant (PDA), a wireless modem, a handheld device, or the like.

Also, the BS 11 may be referred to as "megacell", "macrocell", "microcell", "picocell", "femtocell", or the like based on the size of coverage provided by the corresponding BS. A cell may be used as a term for indicating a frequency band that a BS provides, the coverage of a BS, or a BS.

Hereinafter, a downlink (DL) indicates communication or a communication path from the BS 11 to the UE 12, and an uplink (UL) indicates communication or a communication path from the UE 12 to the BS 11. In the downlink, a transmitter may be a part of the BS 11, and a receiver may be a part of the UE 12. In the uplink, a transmitter may be a part of the UE 12, and a receiver may be a part of the BS 11.

A multiple access scheme applied to the wireless communication system 10 is not limited to a specific scheme. For example, the wireless communication system may utilize various multiple access schemes, such as code division multiple access (CDMA), time division multiple access (TDMA), frequency division multiple access (FDMA), orthogonal frequency division multiple access (OFDMA), single carrier-FDMA (SC-FDMA), OFDM-FDMA, OFDM-TDMA, OFDM-CDMA, and the like. Uplink transmission and downlink transmission may be performed based on a time division duplex (TDD) scheme that performs transmission at different times, or based on a frequency division duplex (FDD) scheme that performs transmission at different frequencies.

Hear, for example, each of terms in association with the aforementioned V2X may be defined as the following Table 1.

TABLE 1

V2V (vehicle-to-vehicle): cover LTE-based communication between vehicles
V2P (vehicle-to-pedestrian): cover LTE-based communication between a vehicle and a device carried by an individual (e.g., a portable terminal carried by a pedestrian, a cyclist, a driver, or passenger).
V2I/N (vehicle-to-infrastructure/network): cover LTE-based communication between a vehicle and a road side unit/network, wherein the road side unit (RSU) is a transport infrastructure entity (entity that transmits speed notification) implemented by an eNB or a stationary UE.

Also, for example, acronyms, in association with configurations in the following description, will be as Table 2.

TABLE 2

Figure 2:
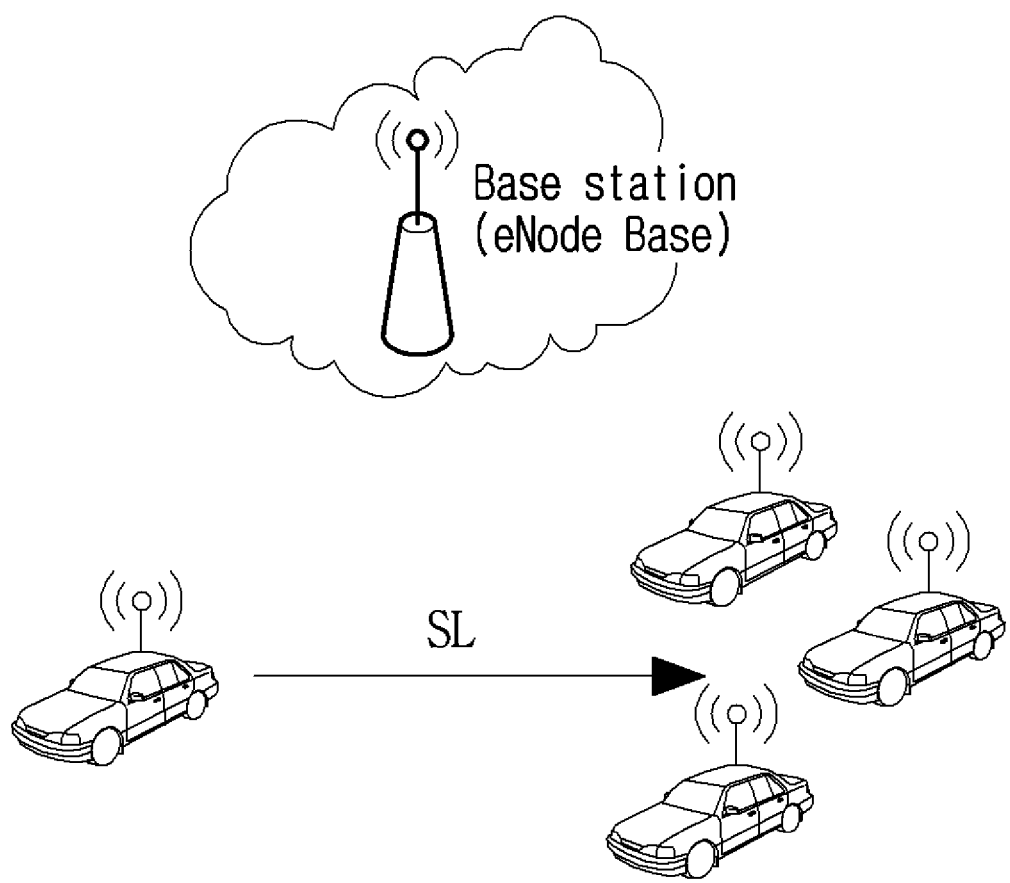
FIG. 2 illustrates a vehicle-to-everything (V2X) link according to the present disclosure.

AS: Access Stratum
BSR: Buffer Status Reporting
CBR: Channel Busy Ratio
D2D: Device to Device (communication)
GNSS: Global Navigation Satellite System
MAC: Media Access Control
MCS: Modulation and Coding Scheme
RLC: Radio link Control
RSU: Road Side Unit
V2X: Vehicle to X(everything)
V2V: Vehicle to Vehicle
V2P: Vehicle to Pedestrian
V2I/N: Vehicle to Infrastructure/Network
SL: Sidelink
SCI: Sidelink Control Information
PSSCH: Physical Sidelink Shared Channel
PSBCH: Physical Sidelink Broadcast Channel
PSCCH: Physical Sidelink Control Channel
PSDCH: Physical Sidelink Discovery Channel
ProSe: (Device to Device) Proximity Services
PPPP: ProSe Per-Packet Priority
PPPR: ProSe Per-Packet Reliability
QoS: Quality of Service In a communication system supporting V2X, a downlink (DL), an uplink (UL), and a sidelink (SL) communications may be possible. For example, FIG. 2 illustrates a link considered in V2X. Also, referring to FIG. 2, a communication system supporting V2X may support only a PC5 link that is a link between UEs, which is defined in device-to-device (D2D) proximity-based service (ProSe)). The PC5 link refers to an interface defined between UEs and may be defined as a sidelink (SL) in a wireless access layer. The sidelink refers to a link in a wireless access layer for direct communication between vehicles for vehicle communication; however, it is not limited thereto.

Figure 3:
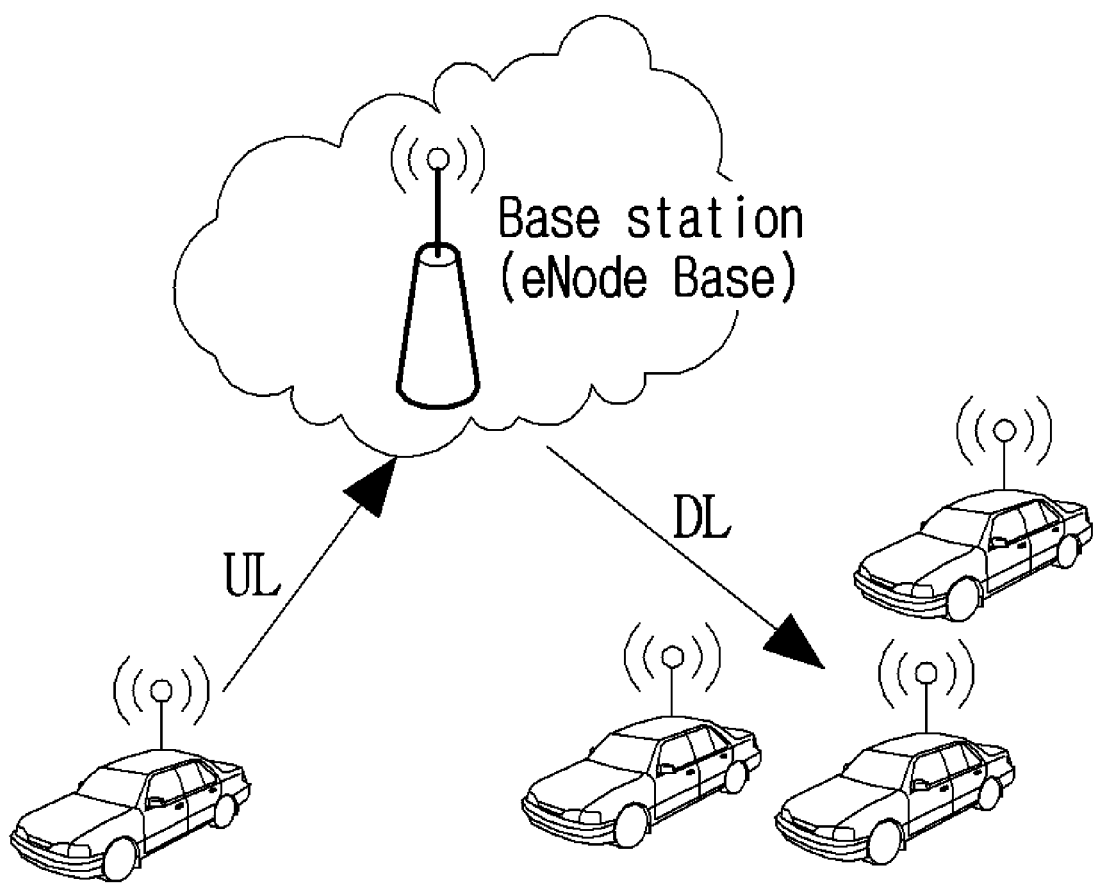
FIG. 3 illustrates a V2X scenario according to the present disclosure.

Also, referring to FIG. 3, a communication system supporting V2X may support only a Uu link that is a link between a base station, for example, eNodeB, and a UE or a link between a wireless access network, for example, Evolved Universal Terrestrial Access Network (E-UTRAN) and a UE. The Uu link may include an uplink (UL) that is a path through which the UE transmits a signal to the base station and a downlink (DL) that is a path through which the base station transmits a signal to the UE.

Also, for example, the terms required in association with V2X may be defined as represented by the aforementioned Table 1 and Table 2. Here, for example, D2D may refer to communication between devices. Also, ProSe may represent a proximity service for a UE that performs D2D communication. Also, SL may be the aforementioned sidelink and sidelink control information (SCI) may represent control information associated with the aforementioned sidelink. Also, a Physical Sidelink Shared Channel (PSSCH) may be a channel used to transmit data through a sidelink and a Physical Sidelink Control Channel (PSCCH) may be a channel used to transmit control information through a sidelink. Also, a Physical Sidelink Broadcast Channel (PSBCH) may be a channel used to broadcast a signal through a sidelink and may be used to transfer system information. Also, a Physical Sidelink Discovery Channel (PSDCH) may be a channel used to discover a channel as a discovery channel.

Also, V2V may represent vehicle-to-vehicle communication, V2P may represent vehicle-to-pedestrian communication, and V2I/N may represent communication between a vehicle and an infrastructure/network. It is further described below.

Here, for example, in association with V2X, the following UE may be a vehicle. In the following, for convenience of description, a UE is uniformly used, however, the UE may be a vehicle for V2X. Also, for example, the UE may refer to a device capable of performing sidelink communication and communicating with a base station. However, it is provided as an example only. Here, in the following, the UE is simply used for clarity of description.

Figure 4:
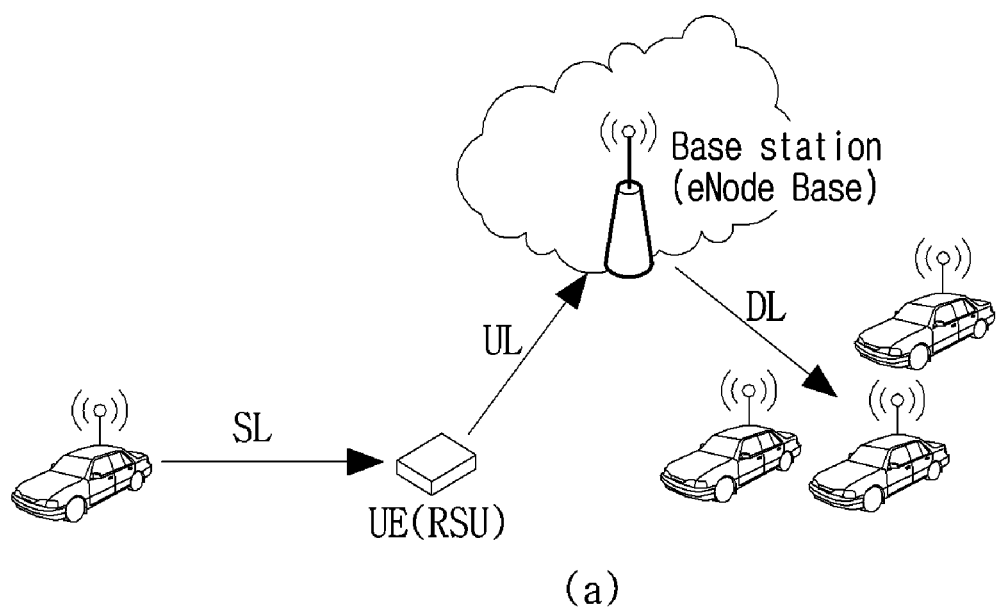
FIG. 4 illustrates a scenario of performing a V2X operation using both a sidelink and communication with a base station according to the present disclosure.
Figure 4:
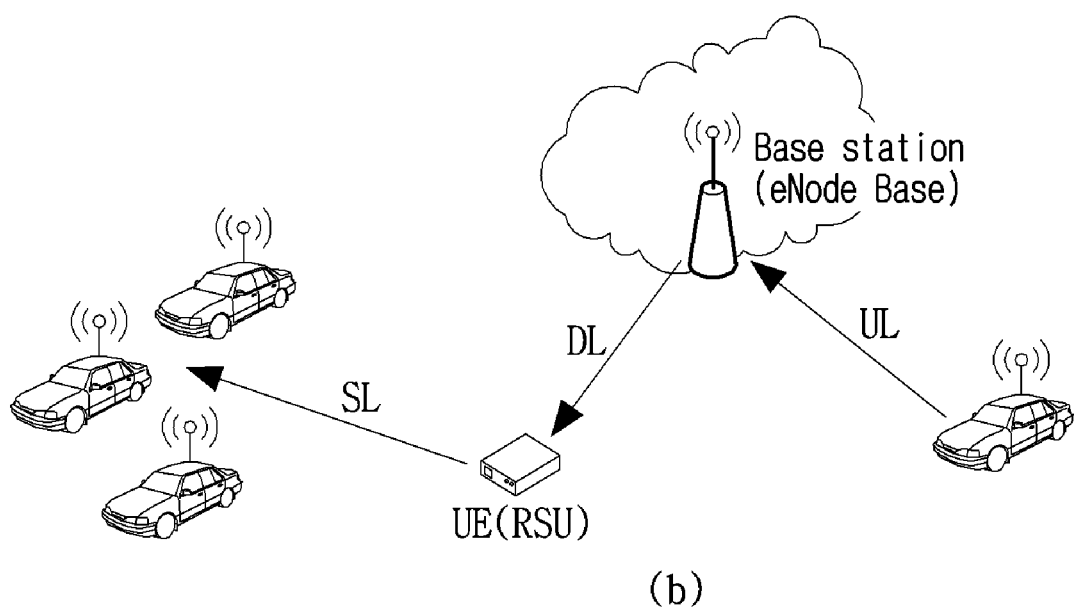

Also, FIG. 4 may be a scenario of performing a V2X operation using all of the aforementioned sidelink and communication with a base station.

Referring to FIG. 4, all of the aforementioned PC5 link and Uu link may be considered, including a road side unit (RSU) in a form of a UE. FIG. 4A illustrates an example in which the base station, for example, eNB and gNB, transmits a signal to a plurality of vehicles and FIG. 4B illustrates an example in which the UE (RSU) transmits a sidelink (SL) signal to a plurality of vehicles.

For example, D2D communication refers to a technology that enables data to be directly transmitted and received between UEs. Hereinafter, it is assumed herein that a UE supports the D2D communication. Also, the D2D communication may be interchangeably represented with proximity-based service (ProSe) or ProSe-D2D communication. The term "ProSe" for D2D communication indicates that the proximity-based service can be added, instead of changing the aforementioned meaning of directly transmitting and receiving data between UEs.

The D2D communication may be classified into a discovery procedure for communication between an in-coverage UE that is a UE located in coverage of a network or an out-of-coverage UE that is a UE located out of coverage of the network and a direct communication procedure of transmitting and receiving control data and/or traffic data between the UEs. Hereinafter, a UE that transmits a signal based on D2D communication is referred to as a transmitting UE (Tx UE) and a UE that receives a signal based on the D2D communication is referred to as a receiving UE (Rx UE). The Tx UE may transmit a discovery signal and the Rx UE may receive a discovery signal. Roles of the Tx UE and the Rx UE may be switched. A signal transmitted from the Tx UE may be received at two or more Rx UEs.

The D2D communication may be used for various purposes. For example, the D2D communication may be used for a public safety, a traffic network service, an ultra-low latency service, and commercial service in network coverage that is based on a commercial frequency. However, in the case of a frequency dedicated for a traffic network, D2D communication through the corresponding frequency may be used only for traffic network communication and traffic safety regardless of the network coverage.

When UEs within proximate distance perform D2D communication in a cellular system, load of wireless resources for the base station may be distributed. Also, when UEs adjacent to each other perform the D2D communication, the UEs may transmit data at a relatively short distance, which may reduce the transmit power of a UE and transmission latency. In addition, existing cellular-based communication and the D2D communication use the same resources from the overall system perspective. Therefore, unless the UEs spatially overlap, it is possible to enhance the efficiency of frequency resources.

Also, although D2D communication is used in the foregoing, it may apply alike to V2X communication. In the foregoing and following, V2X communication is used for clarity of description, but it may also apply alike to D2D communication. However, it is provided as an example only.

The V2X communication may be classified into in-coverage (IC) communication that is communication in network coverage (base station coverage) and out-of-coverage (OCC) communication that is communication out of the network coverage. Here, IC may be communication between UEs present in the network coverage. Also, OCC may be communication between UEs present out of the network coverage.

As another example, the V2X communication may be classified into communication between a UE present in the network coverage and a UE present out of the network coverage.

Figure 5:
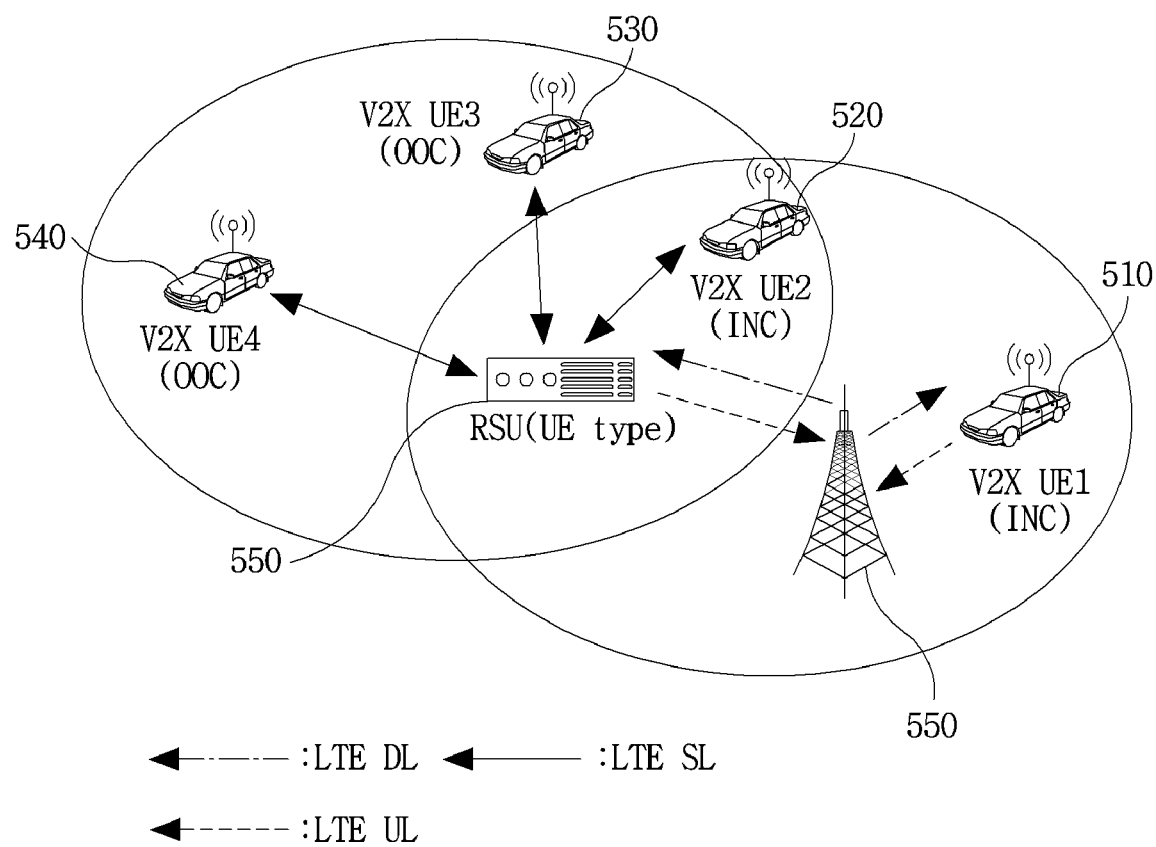
FIG. 5 illustrates a communication scenario according to the present disclosure.

For example, FIG. 5 may be a scenario for V2X communication. Here, referring to FIG. 5, a first UE (V2X UE1) 510 and a second UE (V2X UE2) 520 are present within network coverage and thus, may communicate with a base station. That is, the first UE 510 and the second UE 520 may perform data transmission and reception for a vehicular communication service through the base station (Uu interface) 550. That is, the first UE 510 and the second UE 520 may exchange data for the vehicular communication service through UL data transmission and DL data reception. On the contrary, for example, a third UE (V2X UE3) 530 and a fourth UE (V2X UE4) 540 may be present out of the network coverage. Here, when the third UE 530 and the fourth UE 540 are present at a position at which D2D communication with the first UE 510 and the second UE 520 is impossible, the third UE 530 and the fourth UE 540 may not exchange the data for the vehicular communication service with the first UE 510 and the second UE 520. That is, a UE present at a position at which a physical signal may not arrive may not communicate with another UE, a base station, and a server.

For example, a case in which the fourth UE 540 out of the network coverage requires an access to a network due to a vehicular communication service or a commercial service may be considered. Here, when D2D communication with a road side unit (RSU) 560 present in network service coverage is possible through V2X communication, the RSU 560 may perform relay functionality and the fourth UE 540 out of the network coverage may transmit and receive data to and from a base station through an indirect path. Here, for example, the RSU 560 may be a UE type. Here, the RSU 560 may be another type. However, it is provided as an example only. That is, the RSU 560 may perform relay functionality and the fourth UE 540 may transmit vehicular communication service data to the RSU 560 through a sidelink (SL). The RSU 560 may transfer the vehicular communication service data to a base station 550 using UL transmission through a Uu interface. Next, the first UE 510 and the second UE 520 may receive the vehicular communication service data of the fourth UE 540 from the base station 550. That is, a UE present out of the network coverage may transmit data to UEs in the network coverage through a relay UE, such as an RSU, and a base station of the relay UE.

Figure 6:
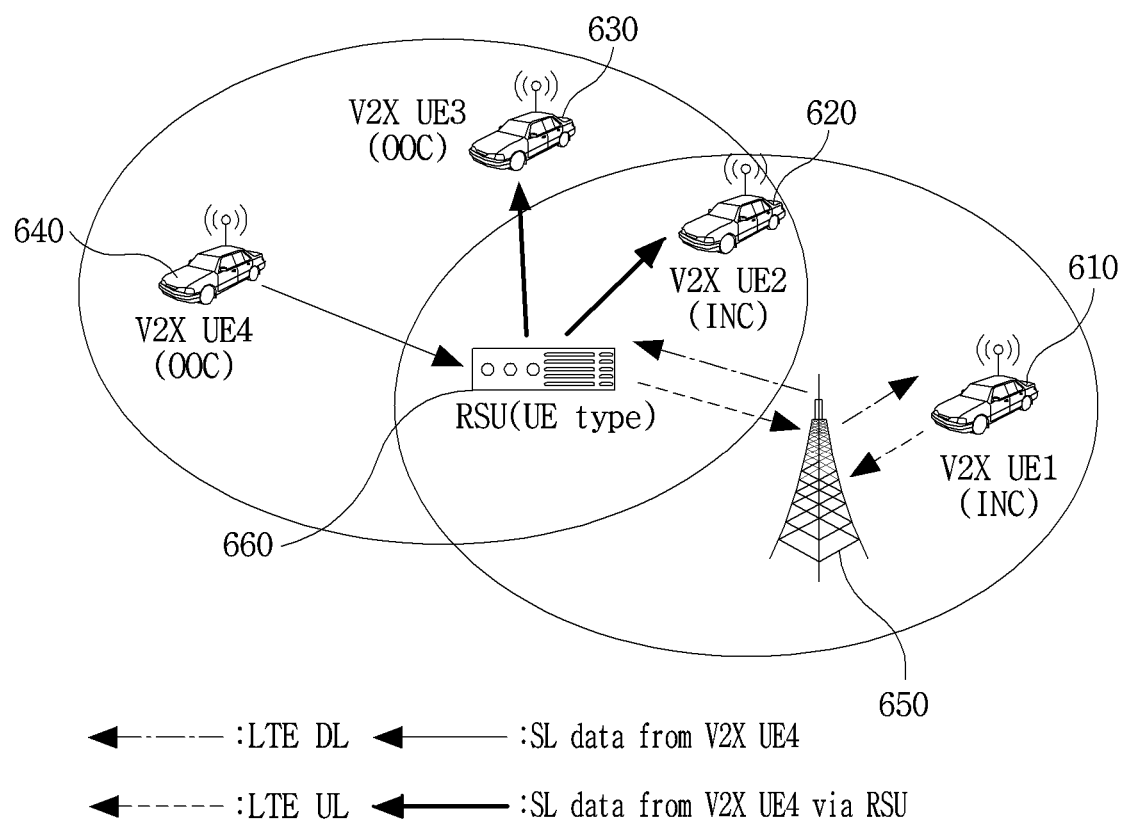
FIG. 6 illustrates a communication scenario according to the present disclosure.

As another example, FIG. 6 illustrates a V2X communication scenario. Here, referring to FIG. 6, as described above, a fourth UE (V2X UE4) 640 may transmit data to an RSU 660. Here, for example, the data may be vehicular communication service data. In the foregoing case, a third UE (V2X UE3) 630 is present at a position incapable of performing communication with the fourth UE 640, but capable of performing sidelink communication with the RSU 660. Here, the third UE 630 also needs to verify data of the fourth UE 640. In detail, since a V2X service is sensitive to a latency, the RSU 660 may need to prepare to transfer data received from the fourth UE 660 to a base station 650 through a Uu interface (LTE or NR uplink) and also prepare to transfer data through a sidelink. That is, to reduce latency occurring when the RSU 660 transfers the data to the base station 650 and then the data is transferred to the RSU 660, the RSU 660 may perform data transmission through sidelink communication. For example, the RSU 660 may operate in a base station-controlled mode or may operate in a UE autonomous determination mode, which is further described below. Here, when the RSU 660 operates in the base station-controlled mode, data received from the fourth UE 640 may be determined as data to be included in Buffer Status Reporting (BSR) for transmission through LTE or NR and, at the same time, may be determined as data to be included in SL BSR. That is, the vehicular communication service data received from the fourth UE 640 may be transferred to a PDCP/RLC layer in a radio bearer (RB) of an LTE side and, at the same time, the same information may be transferred even to a PDCP/RLC layer in an RB of a sidelink side.

Here, a ProSe Priority per Packet (PPPP) of data transferred to the RB of the sidelink side may maintain priority of a received packet as is. For example, when there is no RB of the sidelink side mapped to the priority of the received packet, the RSU 660 may autonomously configure a new RB that supports priority and may transmit a packet. However, it is provided as an example only.

For example, herein, an operation mode may be defined based on a resource allocation scheme for data transmission and control information for V2X communication or direct link (e.g., D2D, ProSe, or SL) communication.

Similar to an LTE V2X system, an NR V2X system may include a network scheduling mode (e.g., mode 1) for performing resource configuration and scheduling from a base station and a non-network scheduling mode (e.g., mode 2) that is a mode in which a Tx UE autonomously determines a resource finally without network scheduling. Here, the network scheduling mode (e.g., mode 1) may be a mode in which the base station schedules a sidelink physical resource for NR V2X sidelink communication. Here, the base station represents a 3GPP NG-RAN and may be gNB or ng-eNB. The base station may directly perform data scheduling for a sidelink physical resource for a corresponding transmission to a Tx UE using a PDCCH (DCI format for NR V2X SL) to directly control NR V2X sidelink communication within corresponding base station coverage based on a sidelink resource allocation request received from each UE.

Also, the non-network scheduling mode (e.g., mode 2) may be a mode in which a UE directly selects and uses a sidelink physical resource (without base station scheduling) from among pre-configured resources or resources configured by the base station.

Here, the non-network scheduling mode (e.g., mode 2) may include a sub-mode as shown in the following Table 3. Here, each sub-mode may be set to one of a mode in which a UE automatically selects a sidelink physical resource, a mode in which a UE assists other UEs to select a sidelink physical resource, a mode in which a UE performs sidelink transmission on a pre-configured sidelink physical resource, and a mode in which a UE schedules sidelink physical resources of other UEs.

TABLE 3 mode 2-1 (a mode in which a UE automatically selects a sidelink physical resource)
In mode 2-1, the UE may autonomously sense a required resource and directly determine a resource and perform NR V2X sidelink communication.
mode 2-2 (a mode in which a UE assists other UEs to select a sidelink physical resource)
A single representative UE may provide guide or information required to schedule a resource for NR V2X sidelink communication of other UEs and
thereby may assist the other Tx UEs to perform resource selection.
mode 2-3 (a mode in which a UE performs sidelink transmission on a pre-configured sidelink physical resource)
In this mode, the UE may perform sidelink transmission using a pre-configured physical resource or sidelink physical resources broadcast from a base station or indicated through a dedicated RRC message.
mode 2-4 (a mode in which a UE schedules sidelink physical resources of other UEs)
In this mode, almost similarly to a base station, a specific UE operates and performs scheduling for sidelink physical resources of other Tx UEs.

Figure 7:
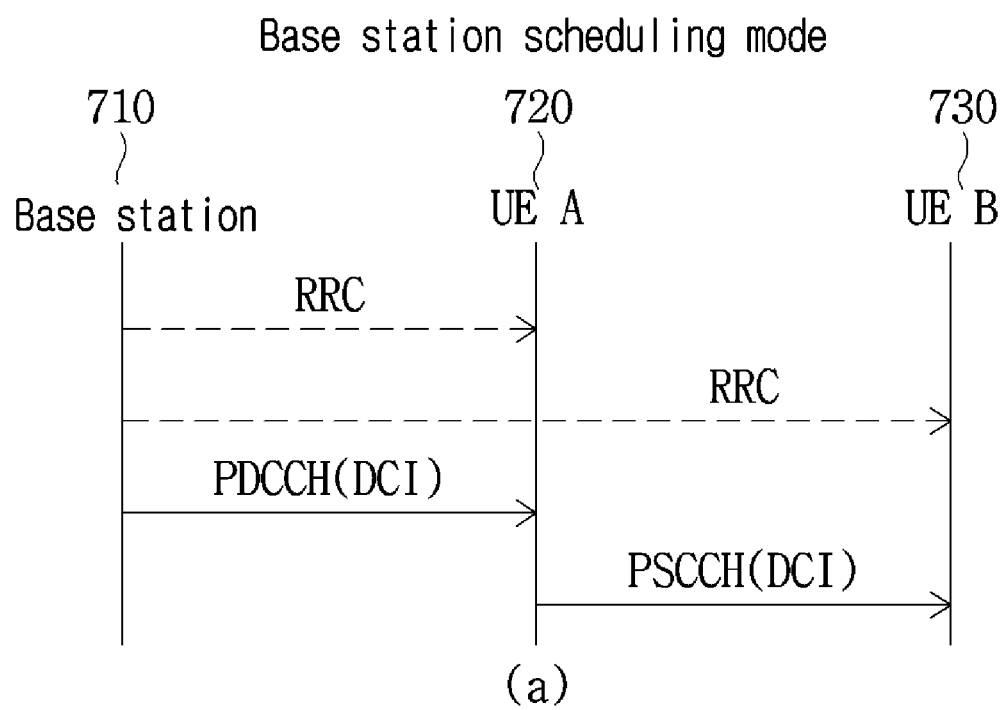
FIG. 7 illustrates an operation based on a base station scheduling mode and a user equipment (UE) autonomous determination mode according to the present disclosure.
Figure 7:
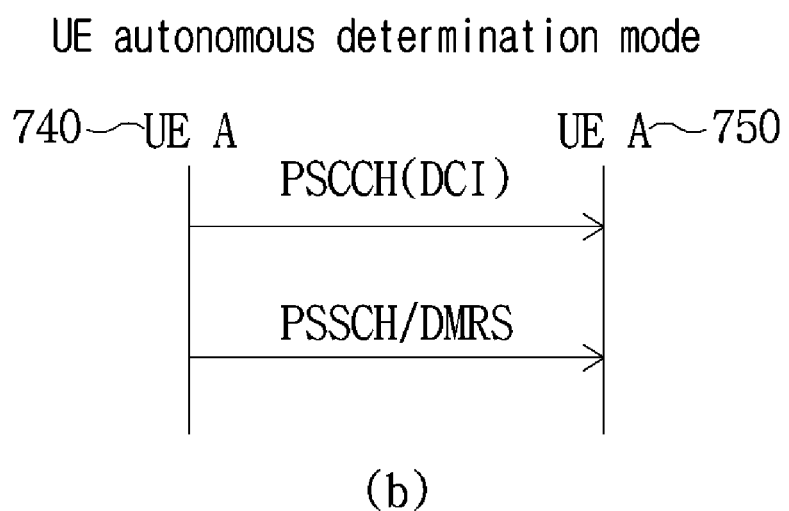

In detail, referring to FIG. 7, an eNodeB resource scheduling mode (mode 1 or mode 3) may be a mode in which a base station or a relay node schedules resources used by a UE to transmit V2X (or direct link) control information and/or data. Through this, the UE may transmit V2X (or direct link) control information and/or data. This mode may be the aforementioned base station resource scheduling mode. Here, for example, the base station may be eNB. Also, for example, the base station may be gNB or ng-eNB as ng-ran. However, it is provided as an example only. Referring to (a) of FIG. 7, a base station 710 may provide scheduling information about a resource to be used for data transmission to a sidelink (or direct link) Tx UE (UE A) 720 through downlink control information (DCI). Therefore, the sidelink (or direct link) Tx UE 720 may transmit sidelink (or direct link) control information (SCI) and data to a sidelink (or direct link) Rx UE (UE B) 730. Meanwhile, the sidelink (or direct link) Rx UE (UE B) 730 may receive sidelink (or direct link) data based on sidelink (or direct link) control information (SCI). However, it is provided as an example only.

Also, referring to (b) of FIG. 7, in a UE autonomous resource selection mode (a non-network scheduling mode, mode 2 or mode 4), a UE may autonomously select resources used by the UE to transmit control information and data and this resource selection may be determined by sensing of the UE from a resource pool (i.e., a set of resource candidates). Through this, the UE may transmit control information and data and this mode may be the UE autonomous resource selection mode.

For example, a sidelink (or direct link) Tx UE (UE A) 740 may transmit sidelink (or direct link) control information and data to a sidelink (or direct link) Rx UE (UE B) 750 using a resource selected by the sidelink (or direct link) Tx UE (UE A) 740. Here, the sidelink (or direct link) Rx UE 750 may receive sidelink (or direct link) data based on the sidelink (or direct link) control information.

Also, referring to the above Table 3, a mode in which a UE automatically selects a sidelink physical resource may be present in association with the UE autonomous resource selection mode. Here, the UE may directly determine a resource by autonomously sensing a required resource and may perform an NR V2X sidelink operation. Also, referring to the above Table 3, a mode in which a UE assists other UEs to select sidelink physical resources may be present. Here, a single representative UE may provide guide or information required to schedule a resource for NR V2X sidelink communication of other UEs and thereby make a contribution to resource selection of the other Tx UEs.

As another example, referring to the above Table 3, a mode in which a UE performs sidelink transmission on a pre-configured sidelink physical resource may be present. Here, in this mode, the UE may perform sidelink transmission using a pre-configured sidelink physical resource or sidelink physical resources broadcast from the base station or indicated through a dedicated RRC message.

As another example, referring to the above Table 3, a mode in which a UE schedules sidelink physical resources of other UEs may be present. Here, almost similarly to a base station, another UE may operate and perform scheduling for sidelink physical resources of other Tx UEs.

Also, for example, the aforementioned base station resource scheduling mode may also be referred to as mode 3 in sidelink (or direct link) communication for V2X. Also, the UE autonomous resource selection mode may be referred to as mode 4 in sidelink communication for V2X. However, it is provided as an example only and is not limited to the aforementioned name. That is, it may be regarded as the same mode for the same target and the same operation.

Also, in the following, although description is made based on mode 1 and mode 2 for clarity of description, it is provided as an example only. For example, the present invention may apply to direct link-based communication, such as D2D and ProSe, and is not limited to the aforementioned example.

Also, as described above, based on a resource allocation mode of a UE, the UE may perform V2X sidelink communication in an RRC idle state, an RRC connected state, or out of network coverage. In detail, a mode 1 UE may perform V2X sidelink communication through a scheduling resource received from a base station and thus, may operate in the RRC connected state. On the contrary, a mode 2 UE may select a V2X sidelink resource from among pre-configured resources without base station scheduling and may perform V2X sidelink communication. Alternatively, the mode 2 UE may select a sidelink resource from among resources configured by the base station and may perform V2X sidelink communication. That is, the mode 2 UE may perform V2X sidelink communication in the RRC connected state, the RRC idle state, or out of the network coverage.

Here, as described above, the UE may receive system information broadcast from the base station in the RRC idle state. The UE may perform V2X sidelink communication based on information included in the broadcast system information. Also, in the RRC connected state, the V2X UE may exchange data with the base station. Here, the base station may control a transmission resource of the UE and, based thereon, the UE may perform V2X sidelink communication.

Also, NR V2X may support an advanced V2X service in addition to a service supported in LTE V2X. For example, the advanced V2X service may be platooning, remote driving, advanced driving, and sensor extension. The services may require low latency and high reliability. To meet such strict requirements, the development of an advanced NR system and new NR sidelink technology is required. Hereinafter, a scenario for the advanced V2X service is described.

In association with a V2X service, platooning may be considered as a new service. Here, information exchange within a group may be required based on platooning. For example, in the case of platooning, a leader may be present in a group. Here, the leader of the group may need to report surrounding traffic data to a group member in real time. The group member also may need to exchange information in real time in the group. For example, a case in which vehicles A, B, C, and D constitute a group may be considered. Here, the vehicle A may be a leader of the group. For example, group members may share real-time surrounding traffic information and road information and the vehicle A may report all the information to a road side unit (RSU).

Here, when the vehicle A discovers a road congestion due to a traffic accident in front of the road through the RSU, the vehicle A may share information received from the RSU with the group members B, C, and D. For example, the vehicles B, C, and D receiving the information as a vehicle or a UE in the group may perform update for driving. For example, the vehicles B, C, and D may update a driving map in real time, reduce a speed, and change a path.

Also, for example, advanced driving may be considered as the V2X service. Here, control information for advanced driving may be exchanged. For example, control information between vehicles may be exchanged to further evaluate and control an accident probability in addition to an operation list, such as cooperative collision avoidance (CoCA) of connected automated vehicles, a cooperative awareness message (CAM) of a vehicle, a decentralized environmental notification message (DENM) safety message, sensor data, and a brake and acceleration instruction. Here, the aforementioned information may be used to control the road traffic flow through 3GPP V2X communication in an application.

For example, with the assumption that UEs (or vehicles) A, B, and C perform CoCA, the UE A may detect a danger through an application and exchange a CoCA related message (trajectory, sensor data, a brake instruction) through V2X communication. The UEs B and C may receive the message and verify CoCA information of the UE A and thereby may adjust a speed and change a position. To support the aforementioned operation, there is a need to exchange a message between UEs in V2X communication. Also, a data throughput of 10 Mbps may need to be supported for the aforementioned information. Also, the network may allow a UE to exchange a message with the reliability of 99.99%. That is, smooth data processing and high reliability may be required. Here, for example, when information is shared for advanced driving between UEs, cooperative recognition for sharing a detected object and a cooperative action of sharing an approximate driving intent such as a lane change between vehicles in the same area may be required.

In detail, local cooperative recognition may be generally defined as sharing local recognition data (abstract data and/or high-resolution sensor data) using V2X communication to expand an on-board sensor function of a detecting function. Here, each vehicle and/or RSU may share its perception data acquired from its local sensor (e.g., a camera, a LiDAR, a radar, etc.) with a nearby vehicle.

Also, the cooperative action may be basically defined as sharing driving intent between nearby vehicles.

For example, each vehicle may share a detected object (e.g., abstract object information detected by a sensor) and/or driving intent with another vehicle. Through this, each vehicle may acquire nonobtainable information about a surrounding object from a local sensor only and may acquire driving intent of another nearby vehicle. In this case, road safety and traffic efficiency may be improved.

This operation may require low latency and high reliability and thus, a message may be transmitted and received directly or through an RSU between UEs in NR V2X. Here, a broadcast scheme, a groupcast scheme, or a periodic information exchange may be used. Also, a cooperative automatic driving may be supplemented through an "emergency trajectory alignment (EtrA)" message between UEs into consideration of a dangerous situation. Operation cooperation through EtrA may assist a driver to safely drive in a dangerous situation. That is, the EtrA message may include sensor data and state information that includes specific information for cooperative avoidance adjustment for safe security in preparation for unexpected road conditions.

For example, when a vehicle acquires information about an obstacle on the road through a sensor, the vehicle may calculate an operation for avoiding an accident based on the information. Also, the vehicle may inform the other vehicle of the information through V2X communication.

To support this operation, V2X may need to enable communication between UEs having [3] ms end-to-end latency, reliability of [99.999] %, and a low data rate of [30] Mbps within communication coverage of [500] m.

Also, for example, a lane change scenario based on cooperation between UEs may be considered. When a vehicle desires to change a lane in a multi-lane road, information exchange between vehicles may be required to perform safe and efficient lane change.

For example, a case in which vehicles A, B, and C support V2X communication and the vehicles B and C are present in an adjacent lane rather than the vehicle A may be considered. Here, the vehicle A may desire to change a lane to the adjacent lane between the vehicles B and C. The vehicle A may notify the vehicles B and C to change a lane and may request a gap generation. In response to receiving the above message, the vehicles B and C may verify generation of a corresponding gap according to the request and may inform the vehicle A of the same. The vehicle A may receive the message and may change the lane. This operation may be supported through message exchange between UEs.

As another V2X service, an extended sensor may be considered. Here, for example, sensor and video information may be shared between UEs (or vehicles). For example, a field of view of a driver may interfere with some road traffic situation, such as driving a truck in front. Video data transmitted from a single vehicle to another vehicle may assist a driver in a critical situation for safety. Also, the video data may be collected and transmitted through an available UE-type RSU.

In the case of using the extended sensor, raw data collected or data processed through a local sensor or live video data between vehicles, RSUs, pedestrian devices, and V2X application program servers. Therefore, a vehicle may improve environmental awareness beyond what its own sensor may detect and may further overall understand a local situation.

However, it may be insufficient to share preprocessed data in a place where an object extracted by automatic object detection is present. For example, when sharing high-resolution video data, a driver may drive according to basic safety configuration. When sharing low-resolution video data, the obstacle may not be visible and overlooked. Therefore, it may be insufficient to drive.

Therefore, this operation requires low latency and high reliability. Also, there is a need for an operation that enables communication between UEs having a data rate of [10] Mbps, a waiting time of [50] ms, and reliability of [90] % within communication coverage of [100] m.

To support the aforementioned V2X service, the low latency and the high reliability may be required. Here, a method of supporting a multi-mode into consideration of the aforementioned V2X service may be required, which is described below.

Figure 8:
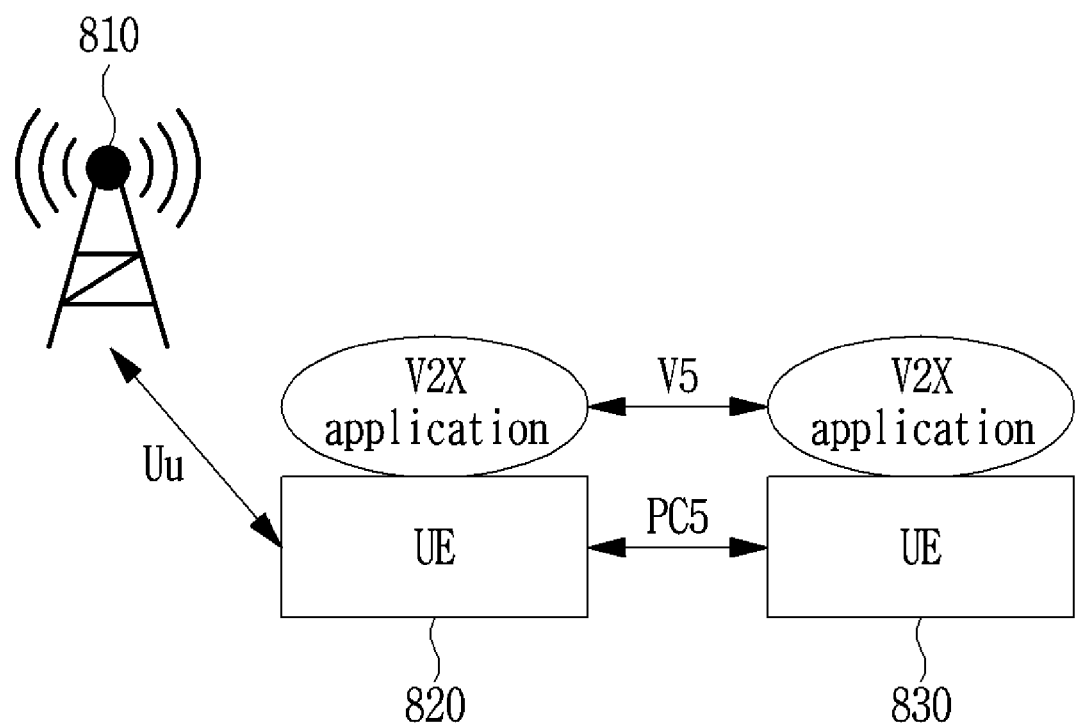
FIG. 8 illustrates an entire structure for V2X communication according to the present disclosure.

FIG. 8 illustrates an entire structure for V2X communication. Referring to FIG. 8, each of V2X UEs 820 and 830 may include a V2X application and a communication protocol stack. Here, communication between the V2X UEs 820 and 830 may be enabled through a PC5 link. Also, communication between V2X applications may be enabled through a V5 link.

Also, communication between a base station 810 and the UEs 820 and 830 may be enabled through a Uu link. Meanwhile, when the UE 820 transmits a V2X message through a PC5 interface, the UE 820 may perform transmission based on a configuration in an application layer. That is, an application layer of a UE may set priority information and quality of service (QoS) information to the generated V2X message and may transfer the aforementioned information to an access stratum (AS) layer with the V2X message. Here, the AS layer that receives the aforementioned configuration information and V2X message may verify priority and reliability of the V2X message and may map the V2X message to an appropriate Sidelink Radio Bearer (SLRB). Here, PDCP, RLC, MAC, PHY layers of the UE may receive the V2X message through the AS layer and may prepare to transmit a message and may perform transmission.

Here, when a packet is transmitted from the RLC layer to the MAC layer, a logical channel may be used. For example, each logical channel may include a pair of different source ID-destination ID. Also, for example, the UE may use a different logical channel based on QoS of a message even in the case of same source ID-destination ID. The MAC layer of the UE may configure a MAC PDU for the packet transferred from the logical channel and may transmit the PAC PDU to a carrier available by the logical channel.

As described above, V2X communication may be performed through a base station and may also be performed through direct communication between UEs. Here, in the case of using the base station, transmission and reception may be performed through a Uu link that is a communication interface between the base station and the UE of LTE in LTE-based V2X communication. Also, in the case of using a sidelink as direct communication between UEs, transmission and reception may be performed through a PC5 link that is a communication interface between UEs of LTE in LTE-based V2X communication.

For example, a 5G sidelink field may include all of sidelink in an LTE system and sidelink technology in an NR system. Here, the sidelink field may be a field essential for performance improvement through ultra-high reliability and ultra-low latency and integration of new and various services.

Figure 9:
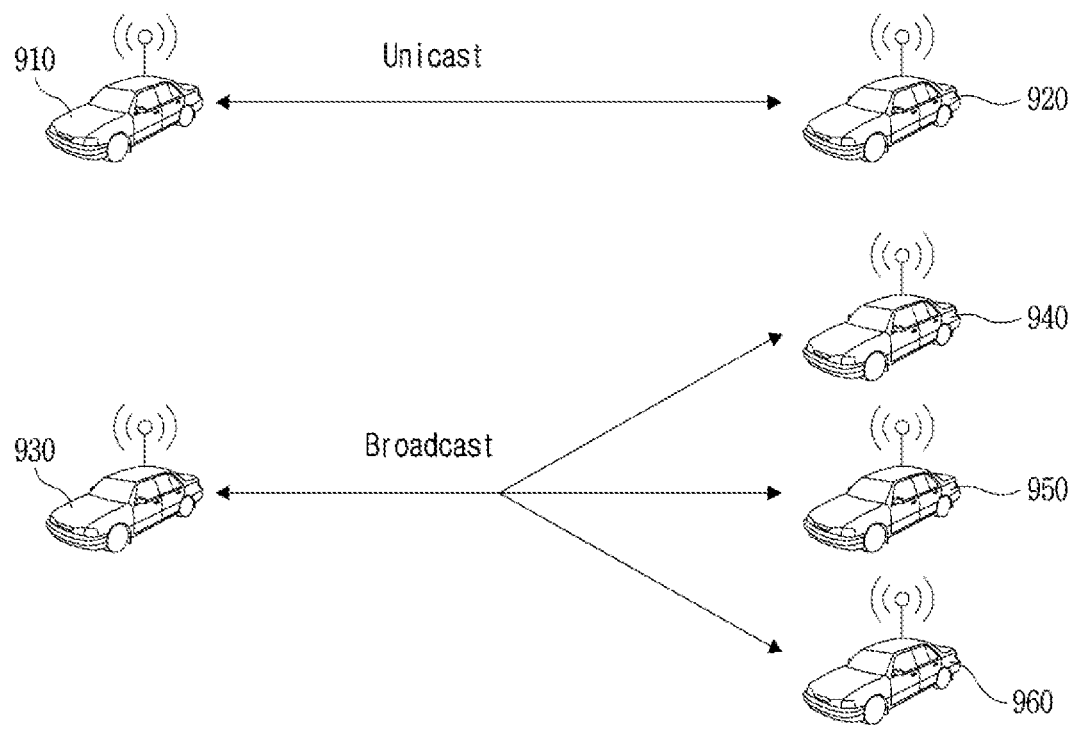
FIG. 9 illustrates a unicast transmission and a broadcast transmission method according to the present disclosure.
Figure 10:
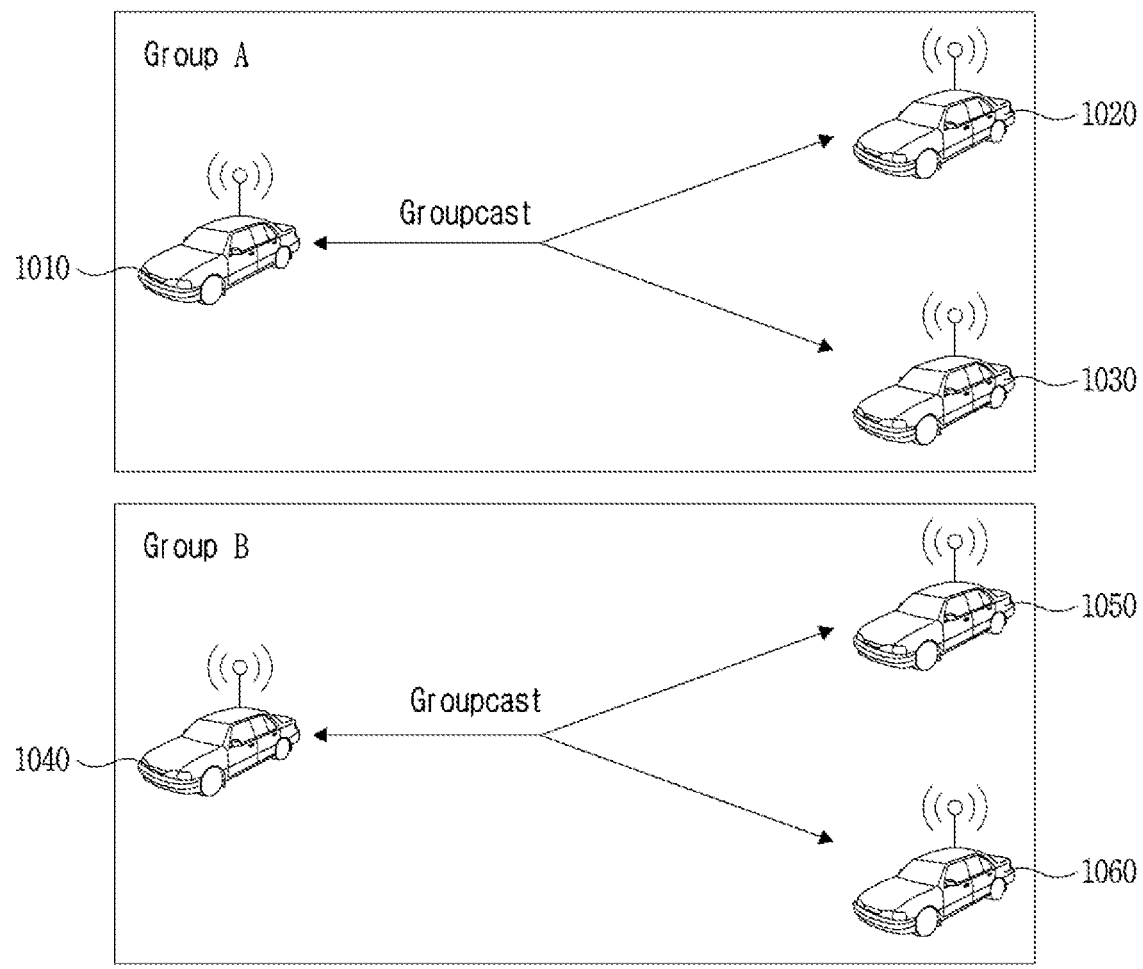
FIG. 10 illustrates a groupcast transmission method according to the present disclosure.

Also, for example, referring to FIGS. 9 and 10, a unicast transmission, a groupcast transmission, and a broadcast transmission may be performed. Here, for example, referring to FIG. 9, the unicast transmission may represent that a single UE 910 transmits a message to another UE 920, that is, a one-to-one transmission. Also, the broadcast transmission may refer to a scheme of transmitting a message to all of UEs regardless of whether an Rx UE supports a service. That is, referring to FIG. 9, a single UE 930 may transmit a message regardless of whether Rx UEs 940, 950, and 960 support the service. Meanwhile, a groupcast transmission scheme may refer to a scheme of transmitting a message to a plurality of UEs belonging to a group.

Here, referring to FIG. 10, a UE 1010 included in a group A may transmit a message to Rx UEs 1020 and 1030 included in the group A through a groupcast scheme. Here, since a message is not transmitted to Rx UEs included in a group B, the groupcast scheme differs from the broadcast scheme. Also, for example, as described above, a UE 1040 included in a group B may transmit a message to Rx UEs 1050 and 1060 through the groupcast scheme. Meanwhile, the unicast transmission scheme and the groupcast transmission scheme may apply to V2X communication, which is further described below. For example, to support the aforementioned V2X service, low latency and high reliability may be required. Here, in the case of sharing information based on the aforementioned broadcast scheme, it may be difficult to meet requirements of V2X communication. Therefore, NR V2X may need to support unicast and/or groupcast that is a new bi-directional transfer mechanism to process high-speed data transmission between vehicles in addition to the aforementioned broadcast mechanism.

In the following, a method of configuring, by a UE, a PC5 RRC when an NR system supports unicast and/or groupcast for V2X is described into consideration of the aforementioned description. Meanwhile, the following example may relate to a case in which V2X UEs perform communication based on a V2X sidelink. Here, the present invention may expansively apply to a similarly applicable field. However, it is provided as an example only.

As described above, a V2X UE may perform a unicast and/or groupcast operation to support a V2X service. For example, a UE (or a vehicle, hereinafter, referred to as a "UE") may share information with a neighboring UE for specific QoS. Here, the UE may discover a UE that supports the corresponding service and may trigger the service. That is, the UE may perform the unicast/groupcast operation with the UE that supports the corresponding service. Here, an operation of discovering the UE that supports the service and triggering the service may be performed based on an application layer of the UE. For example, the application layer may exchange information with another application through a V5 link. Also, the application layer may search for an application that supports the same service through a V5 link. Subsequently, the application layer of the UE may start a link configuration process for unicast and/or groupcast communication.

Here, the link configuration process may be used to set a safe direct connection between two UEs. That is, in the link configuration process, a UE that requests a link configuration and a target UE that responds thereto may be present. For example, only when a link configuration condition is met, the UE may perform the link configuration process. Here, the aforementioned link configuration condition may be a case in which there is no link between the request UE and the target UE, an ID for the request UE is available, and an ID for the target UE is available. However, it is provided as an example only and other conditions may be set.

Here, when the aforementioned condition is met, a UE that requests the link configuration may generate a "DIRECT_COMMUNICATION_REQUEST" message and may start the link configuration process. For example, the aforementioned message may include at least one of UE information, IP address information, and security information. Here, the UE that generates the "DIRECT_COMMUNICATION_REQUEST" message based on the aforementioned information may transfer the message to a lower layer with a source ID and a destination ID such that the lower layer may transmit the message. Also, for example, the UE may start a timer at a point in time at which transmission is performed. Here, the UE may expect to receive a response message from the target UE while the timer is operating. That is, the UE may receive the response message during a period of time set by the timer.

Here, for example, the target UE may receive a link configuration request message and may verify information included in the link configuration request message. The target UE may determine whether to accept a corresponding request based on the link configuration request message. For example, the UE may verify whether at least one common IP address is present based on IP address information of the link configuration request message. Here, when at least one common IP address is present, the target UE may perform security verification with the request UE. Once the security verification is completed, the target UE may transmit an accept message for a link configuration request as a response message.

Here, the link configuration accept message may be "DIRECT_COMMUNICATION_ACCEPT" and the message may include IP address information. When the ACCEPT message is received, the request UE may suspend the operating timer and may complete the link configuration process with the target UE. On the contrary, when the target UE rejects the link configuration request, the target UE may transmit a "DIRECT_COMMUNICATION_REJECT" message to the request UE. For example, the message may include a rejection reason. When the request UE receives the REJECT message, the request UE may suspend a link configuration attempt with the target UE.

Also, for example, after the request UE and the target UE complete link configuration in an application layer, the UEs may additionally perform an RRC connection configuration. That is, after completing the link configuration, the two UEs may perform the RRC connection configuration.

Here, for example, when the two UEs complete link configuration as one-to-one connection based on unicast, the UEs may perform one-to-one PC5 RRC connection configuration between the UEs. Also, for example, when the link configuration is completed based on a groupcast, a UE having performed the groupcast may perform one-to-one PC5 RRC connection with another UE in a group. For example, the UE having performed the groupcast may perform PC5 RRC connection with a specific UE in a group. Here, the specific UE may be another UE present in the group. Also, for example, the specific UE may be a leader UE among UEs present in the group. For example, in the case of platooning, a leader UE and a non-leader UE may be present in a group. Here, the leader UE of the group may perform PC5 RRC connection configuration with each of UEs in the group to control each UE in the group. Here, for example, when the leader UE and the non-leader UE in the group perform one-to-one PC5 RRC connection configuration, the RRC connection configuration may be performed in the same manner as a one-to-one RRC connection configuration process between a UE and a base station. Also, for example, when the leader UE and the non-leader UE in the group perform one-to-one PC5 RRC connection configuration, the RRC connection configuration may be performed in the same manner as a one-to-one PC5 RRC connection configuration process between two UEs in unicast. Here, since the aforementioned configuration process is performed in the same manner, additional UE complexity may be avoided.

Also, for example, when a UE performs unicast and/or groupcast, the UE may need to verify at least one of a UE ID of a target UE, a UE capability, a bearer configuration, physical layer configuration information (e.g., HARQ, CSI), resource configuration information, and QoS information. Also, for example, the UE may further verify another information of the target UE. However, it is provided as an example only. Here, for example, the aforementioned information may be AS layer related information of the UE. The UE may exchange the information through a PC5 RRC message. Here, for example, the UE may maintain security by performing PC5 RRC connection configuration. Also, the UE may perform at least one of setting, configuration, maintenance, and release of a data radio bearer (DRB) with a signaling radio bearer (SRB) by performing the PC5 RRC connection configuration. Also, the UE may function to detect and recover a radio link failure by performing the PC5 RRC connection configuration. Also, the UE may perform another role through the PC5 RRC connection configuration. However, it is provided as an example only.

<SL HARQ>

For example, a V2X UE may support HARQ feedback to meet requirements of low latency and high reliability data when performing unicast/groupcast communication. An Rx UE may inform whether decoding of a received packet is a succeed or a failure through SL HARQ feedback. When an Rx side fails in decoding, a Tx UE may retransmit the packet and thereby meet low latency and high reliability requirements of the packet.

To support an SL HARQ operation, the Tx UE may include, in SCI, L1 destination ID, L1 source ID, HARQ process ID, NDI, redundancy version (RV) information when transmitting the packet.

Layer-1 Destination ID

The L1 destination ID is used to identify an Rx UE having to receive related PSSCH transmission.

Layer-1 Source ID

The L1 source ID is used for an Rx UE to identify a Tx UE.

HARQ Process ID

The HARQ process ID is used to support multi-parallel HARQ feedback transmission between the same Tx UE and Rx UE. There is an advantage in that it is possible to improve transmission efficiency and to reduce a waiting time of a packet.

Also, when receiving a packet for HARQ retransmission, the Rx UE may identify the packet based on the HARQ process ID and may combine the retransmitted packet and an existing packet.

NDI (New Data Indicator)

The NDI is used to indicate whether a packet is initially transmitted or retransmitted in an HARQ process. The Rx UE may determine whether to perform packet combination using an initially received packet or a re-received packet based on toggle of the NDI.

RV (Redundancy Version)

The RV is used to maintain the same understanding about an RV index between a Tx UE and an Rx UE into consideration of a probability about missing of a previous transmission.

The information may be transmitted in an SCI format through a Physical Sidelink Control Channel (PSCCH) and the UE may transmit the packet through a Physical Sidelink Shared Channel (PSSCH).

The Rx UE may receive the related packet through the PSSCH and may transmit SL HARQ feedback based on a decoding result of the packet. Here, the SL HARQ feedback may be transmitted in a sidelink feedback control information (SFCI) format through a Physical Sidelink Feedback Channel (PSFCH). That is, the PSFCH may be an NR HARQ feedback channel as a physical channel and HARQ-ACK/NACK feedback information corresponding to an NR sidelink data channel may be transferred through an NR PSFCH.

Here, for unicast/groupcast communication, SL HARQ feedback may be activated or inactivated. For example, in a case in which the SL HARQ feedback is activated for the unicast communication, when the Rx UE successfully decodes the received packet, the Rx UE can generate HARQ-ACK and thereby report the feedback information. On the contrary, when the Rx UE does not successfully decode the received packet, the Rx UE can generate HARQ-NACK and thereby report the feedback information. As another example, in a case in which SL HARQ feedback is activated for the groupcast communication, only when the Rx UE does not successfully decode the received packet, the Rx UE may generate HARQ-NACK and thereby report the feedback information. Alternatively, depending on whether the received packet is successfully decoded, the Rx UE can generate HARQ-ACK or HARQ-NACK and thereby report the feedback information.

Based on the SL HARQ feedback information reported by the Rx UE, the Tx UE may perform HARQ retransmission for the related packet or may perform new HARQ transmission and thereby meet service requirements such as low latency and high reliability.

<SL Configured Grant>

As another example, a base station may pre-configure a transmission resource in a UE as a configured grant to meet requirements of low latency and high reliability data when performing unicast/groupcast communication. That is, the base station may pre-configure the transmission resource in a mode 1 UE as the configured grant with respect to a portion of carriers capable of performing sidelink packet transmission.

Here, two types of configured grants may be present in an NR. For example, a configured grant may represent that a sidelink resource to be used by a V2X UE is pre-configured. For example, in the case of a mode that operates based on base station scheduling, when the V2X UE has data to be transmitted, the V2X UE may perform data transmission through the pre-configured grant without requesting the base station for a sidelink grant.

For example, type 1 (configured grant type 1) may be configured through an RRC reconfiguration message. Here, type 1 may be configured for each BWP of each carrier, for each resource pool of each carrier, or for each carrier. Here, a configured grant based on type 1 may be valid as a configured grant although a V2X UE does not use a carrier, a BWP, or a resource pool in which a type 1 grant is configured. Therefore, when the V2X UE selects the carrier, the BWP, or the resource pool configured based on type 1 as the configured grant, the V2X UE may perform data transmission by immediately using a resource without performing an additional operation. That is, the V2X UE may meet low latency requirements of a service by transmitting data immediately using the configured grant at the very moment of selecting the carrier, the BWP, or the resource pool in which configured grant type 1 is configured.

Also, the configured grant type 1 may be configured for the purpose of Ultra-Reliable and Low Latency Communications (URLLC) data transmission. For example, configured grant type 1 of the V2X UE may be configured for each logical channel. That is, the V2X UE may transmit data by using the configured grant only for a logical channel capable of using configured grant type 1. That is, as described above, whether configured grant type 1 is available may be set to the logical channel.

As another example, configured grant type 1 may be shared with another UE. Therefore, the V2X UE may repeatedly transmit the same data several times to increase a transmission probability even at an occurrence of a collision. Also, when the V2X UE transmits data using configured grant type 1, the V2X UE may operate based on configuredgrantTimer. For example, the V2X UE may wait for HARQ feedback during the operation of the timer. If the timer expires, the V2X UE may discard data stored in an HARQ buffer and may transmit another data.

On the contrary, type 2 (configured grant type 2) may be a configured grant that is dynamically configured through a PDCCH. For example, type 2 may be valid only in a carrier, a BWP, or a resource pool currently being used. That is, as described above, the V2X UE may transmit data without causing latency for a transmission resource selection process based on the configured grants of type 1 and type 2.

Also, for example, configured grant type 2 may be configured for the purpose of periodic data transmission. Here, the V2X UE may transmit data using configured grant type 2 and may be activated or inactivated by a PDCCH.

Here, all of type 1 and type 2 may be used in a V2X system to meet requirements of low latency data. For example, in a base station scheduling mode (mode 1 or mode 3), a configured grant may be configured by a base station based on an RRC or a PDCCH.

The aforementioned advanced V2X service requires low latency and high reliability. To meet strict requirements of the advanced V2X service, NR V2X desires to support HARQ retransmission and a configured grant. Here, to support the operation, there is a need to define a new network configuration and UE operation. Therefore, in the following, an HARQ retransmission method in a configured grant is proposed as a method of meeting requirements of the advanced V2X service. Meanwhile, the following example may refer to a case in which V2X UEs perform communication based on a V2X sidelink. Here, without being limited to the aforementioned example, the present disclosure may expand to a similarly applicable field.

Example 1. HARQ Retransmission Support Method in Configured Grant

Hereinafter, a method of performing, by a mode 1 UE, an HARQ retransmission in a configured grant is described based on the aforementioned description. Here, without being limited to the aforementioned example, the present disclosure may expand to a similarly applicable field.

The mode 1 UE may use an SL configured grant that is pre-configured by a base station or a dynamic SL grant that is dynamically allocated by the base station to transmit a V2X message.

Here, for example, the mode 1 UE may use the SL configured grant to transmit the V2X message.

To perform the operation, the base station may configure a configured grant for the mode 1 UE. In detail, the base station may configure type 1 (configured grant type 1) through an RRC reconfiguration message. Alternatively, the base station may configure type 2 (configured grant type 2) through a PDCCH. Here, when configuring the grant of type 1 and/or type 2, the base station may configure the following parameters. For example, the parameters may include cs-RNTI, periodicity, timeDomainOffset, timeDomainAllocation, and nrofHARQ-Processes. cs-RNTI may represent a UE ID used for HARQ retransmission and periodicity may represent periodicity of the configured grant. Also, timeDomainOffset may represent a grant offset about SFN=0 in a time domain, and timeDomainAllocation may represent allocation information of an SL configured grant in the time domain that includes startSymbolAndLength. Also, S may represent a start symbol of a slot. Also, nrofHARQ-Processes may represent a number of HARQ processes for a configured grant. Here, the base station may not configure timeDomainOffset and timeDomainAllocation for type 2. Also, for type 2, cs-RNTI may be used for activation or inactivation of type 2 grant.

As described above, for example, when configured grant type 1 is configured in a UE, the UE may be aware of a symbol in which an $N^{th}$ SL configured grant is present according to the following formula.

[($SFN$×numberOfSlotsPerFrame×numberOfSymbolsPerSlot)+(slot number in the frame×numberOfSymbolsPerSlot)+symbol number in the slot]=(timeDomainOffset×numberOfSymbolsPerSlot+$S$+$N$×periodicity)modulo(1024×numberOfSlotsPerFrame×numberOfSymbolsPerSlot), for all $N$>=0.

As another example, when configured grant type 2 is configured in a UE, the UE may be aware of a symbol in which a configured grant is present according to the following formula.

[($SFN$×numberOfSlotsPerFrame×numberOfSymbolsPerSlot)+(slot number in the frame×numberOfSymbolsPerSlot)+symbol number in the slot]=[(SFNstart time×numberOfSlotsPerFrame×numberOfSymbolsPerSlot+slotstart time×numberOfSymbolsPerSlot+symbolstart time)+$N$×periodicity]modulo(1024×numberOfSlotsPerFrame×numberOfSymbolsPerSlot), for all $N$>=0.

Also, when using a configured grant, a UE may induce a related HARQ process ID according to the following formula.

HARQ Process ID=[floor(CURRENT_symbol/periodicity)]modulo nrofHARQ-Processes

Here, CURRENT_symbol/periodicity may be induced according to CURRENT_symbol=(SFN×numberOfSlotsPerFrame×numberOfSymbolsPerSlot+slot number in the frame×numberOfSymbolsPerSlot+symbol number in the slot). Also, numberOfSlotsPerFrame and numberOfSymbolsPerSlot denote a number of consecutive slots per slot and a number of consecutive symbols per slot, respectively.

Next, when the UE desires to transmit data through the configured grant at a time of performing unicast/groupcast communication, the UE may include, in SCI, L1 destination ID, L1 source ID, HARQ process ID about the configured grant, NDI, and RV information. Here, the L1 destination ID and the L1 source ID represent IDs used in a physical layer for the respective unicast/groupcast. The ID may be set based on which transmission scheme data to be transmitted corresponds between unicast and groupcast. As described above, the HARQ process ID may be induced according to the formula. The HARQ process ID may be set as the ID induced according to the formula. The NDI may be set as a value of 0 or 1 and a default value may be set as 0. Next, the UE may toggle an NDI value for data to be initially transmitted and may not toggle an NDI value and may maintain an existing NDI value for retransmission data. RV may be set in order of 0, 2, 3, and 1. In the case of transmitting initial data for the configured grant, an RV value may be 0.

The UE may configure SCI based on the aforementioned description and may transmit the SCI through a PSCCH. The UE may transmit data related to the SCI through a PSSCH. Here, when transmitting data using the configured grant, the UE may start configuredgrantTimer. For example, the V2X UE may wait for HARQ feedback during the operation of the timer. If the timer expires, the V2X UE discards data stored in an HARQ buffer and may transmit another data.

Here, a V2X UE that receives a configured grant from a base station and transmits sidelink data may be defined as a Tx UE. Also, a UE that receives the sidelink data from the Tx UE may be defined as an Rx UE.

Here, for example, when the Rx UE that receives SCI and related data succeeds in receiving the SCI but fails in decoding data, the Rx UE may generate and transmit an HARQ-NACK message. As another example, when the Rx UE that receives SCI and related data succeeds in decoding data, the Rx UE may generate and transmit an HARQ-ACK message.

In detail, for example, the Rx UE may report the HARQ feedback to the Tx UE having transmitted the packet. The Tx UE that receives the HARQ feedback may transfer the HARQ feedback to the base station. The base station may allocate an SL grant to a UE for HARQ retransmission or may be aware that the packet is successfully transmitted based on the HARQ feedback information. As another example, the Rx UE may report the HARQ feedback to the base station. The mode 1 UE requires a base station scheduling resource to perform HARQ retransmission. Here, when the HARQ feedback information is transferred from the Rx UE to the Tx UE and then from the Tx UE to the base station, latency may occur when the base station schedules a resource for retransmission. Therefore, the Rx UE may immediately report the HARQ feedback to the base station, thereby reducing the latency for HARQ retransmission resource rescheduling. As another example, the Rx UE may report the HARQ feedback to all of the Tx UE having transmitted the packet and the base station.

Here, according to the aforementioned operation, for example, when the Tx UE receives an HARQ-ACK message from the Rx UE during the operation of configuredgrantTimer, or if configuredgrantTimer expires, the Tx UE may discard data stored in an HARQ buffer for a corresponding HARQ process ID and may transmit another data.

As another example, when the Tx UE receives an HARQ-NACK message from the Rx UE during the operation of configuredgrantTimer, the Tx UE may transfer an HARQ-NACK message to the base station. As another example, while configuredgrantTimer operates in the Tx UE, the base station may receive the HARQ-NACK message from the Rx UE.

Example 1-1. Use of Dynamic Allocated Grant for Retransmission

Here, for example, a UE may use a base station dynamic allocated grant (SL grant) to perform retransmission. In detail, the base station that receives an HARQ-NACK message from a Tx UE or an Rx UE may schedule the SL grant to the Tx UE for data retransmission. Here, the base station may provide HARQ information with the SL grant. For example, the HARQ information may include HARQ process ID, NDI, and RV information. Here, the HARQ process ID may be set as an HARQ process ID for a configured grant to perform HARQ retransmission. The NDI may be set to 0 or 1. If NDI=0, it may represent the SL grant for HARQ retransmission. If N=1, it may represent activation or inactivation for configured grant type 2. That is, when providing the SL grant for retransmission, the NDI may be set to 0 at all times. The RV may be set to a value of 0, 2, 3, or 1. Here, the UE may perform HARQ retransmission using the SL grant. Here, HARQ information (HARQ process ID, NDI, RV) included in SCI may be HARQ information received from the base station.

Here, as described above, when the UE performs HARQ retransmission using the dynamic allocated grant for the configured grant, the UE may need to autonomously set an NDI value and include the NDI value in SCI instead of following the NDI value set by the base station. When the base station schedules an SL grant to perform HARQ retransmission for the configured grant, the NDI value set by the base station, as a fixed value, does not represent whether to perform retransmission of a packet through toggle. Therefore, when the Tx UE uses the NDI value as is to perform SL HARQ retransmission, an Rx side may erroneously interpret the same in receiving the packet. Therefore, in the following, an additional method may be required to provide accurate information to the Rx UE and thereby increase HARQ success probability, which is further described below.

Figure 11:
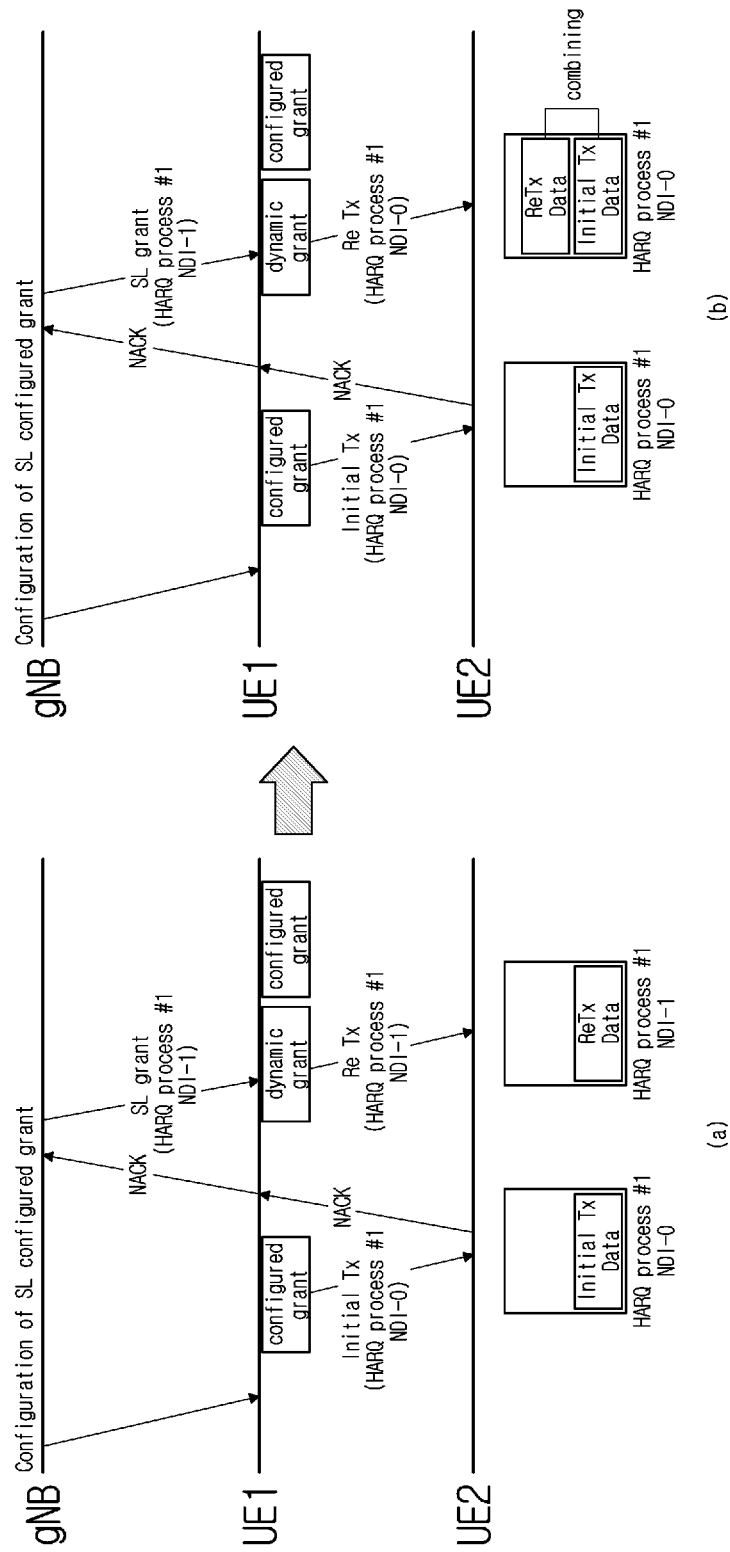
FIG. 11 illustrates a Hybrid Automatic Repeat and Request (HARQ) retransmission method using a dynamic grant in a configured grant according to the present disclosure.

FIG. 11 illustrates an HARQ retransmission method using a dynamic allocated grant (dynamic grant) in a configured grant according to the present disclosure.

Referring to FIG. 11, for example, a Tx UE (UE 1) may configure a configured grant (SL configured grant) through base station configuration. The Tx UE (UE 1) may perform initial data transmission for HARQ process #1 using the configured grant. Here, for example, the Tx UE (UE 1) may set an NDI to 0 and may include the HARQ process ID, L1 ID including the NDI, and RV information in SCI and may transmit the SCI through a PSCCH. Next, the Tx UE (UE 1) may transmit related data corresponding to the SCI through a PSSCH.

An Rx UE (UE 2) that receives data according to the SCI may store the data according to the SCI in an HARQ buffer about HARQ process ID #1 and may set the NDI to 0 and thereby consider the same as a packet initially received for the corresponding HARQ process. Next, when the Rx UE (UE 2) attempts to decode the data but fails in decoding the data, the Rx UE (UE 2) may generate and transmit HARQ-NACK feedback.

Here, the Tx UE (UE 1) that receives the HARQ-NACK message may transfer the HARQ-NACK message to the base station and may notify the base station of a failure of the corresponding packet transmission and may expect an SL dynamic allocated grant (SL grant) from the base station to perform HARQ retransmission.

Next, the base station (gNB) may provide related HARQ information to the Tx UE (UE 1) with the SL grant to perform HARQ retransmission for the data. Here, the HARQ process ID of the HARQ information may be set to 1 and the NDI may be set to 1, which represents retransmission.

The Tx UE (UE 1) may be aware that there is a need to retransmit data for HARQ process #1 through the SL grant and the related HARQ information and may perform sidelink HARQ retransmission using the SL grant.

Here, for example, referring to (a) of FIG. 11, the Tx UE (UE 1) may configure SCI by setting the HARQ process ID to 1 and setting the NDI to 1 in the SCI based on HARQ information configured by the base station and may transmit the SCI and related data. Here, although the data is retransmission data, the Rx UE (UE 2) may consider the retransmission data as initially received data into consideration that the data is toggled based on NDI information in the SCI. That is, the Rx UE (UE 2) may consider the retransmission data as an initially transmitted packet and may discard data stored in the existing HARQ process ID #1 and may store the retransmitted data. This makes a UE operation of improving a decoding success probability through combination between existing received data and re-received data meaningless. Therefore, additional HARQ retransmission may be performed and this operation may not readily meet requirements of a unicast/groupcast service, that is, low latency and high reliability.

Therefore, referring to (b) of FIG. 11, when the Tx UE (UE 1) configures HARQ information in SCI, an RV value that includes an HARQ process ID may follow HARQ information configured by the base station, however, an NDI value may be set and configured by the UE itself. That is, in a case in which the Tx UE (UE 1) receives an SL grant for HARQ retransmission from the base station, when configuring an NDI value, the Tx UE (UE 1) may perform HARQ retransmission using an existing NDI value set by an existing UE instead of following an NDI value set by the base station. Here, the Rx UE (UE 2) may consider the retransmission data as re-received data into consideration that the retransmission data is not toggled according to NDI information in SCI and may support a successful data reception by increasing a decoding success probability through combination with data stored in the corresponding HARQ buffer.

Figure 12:
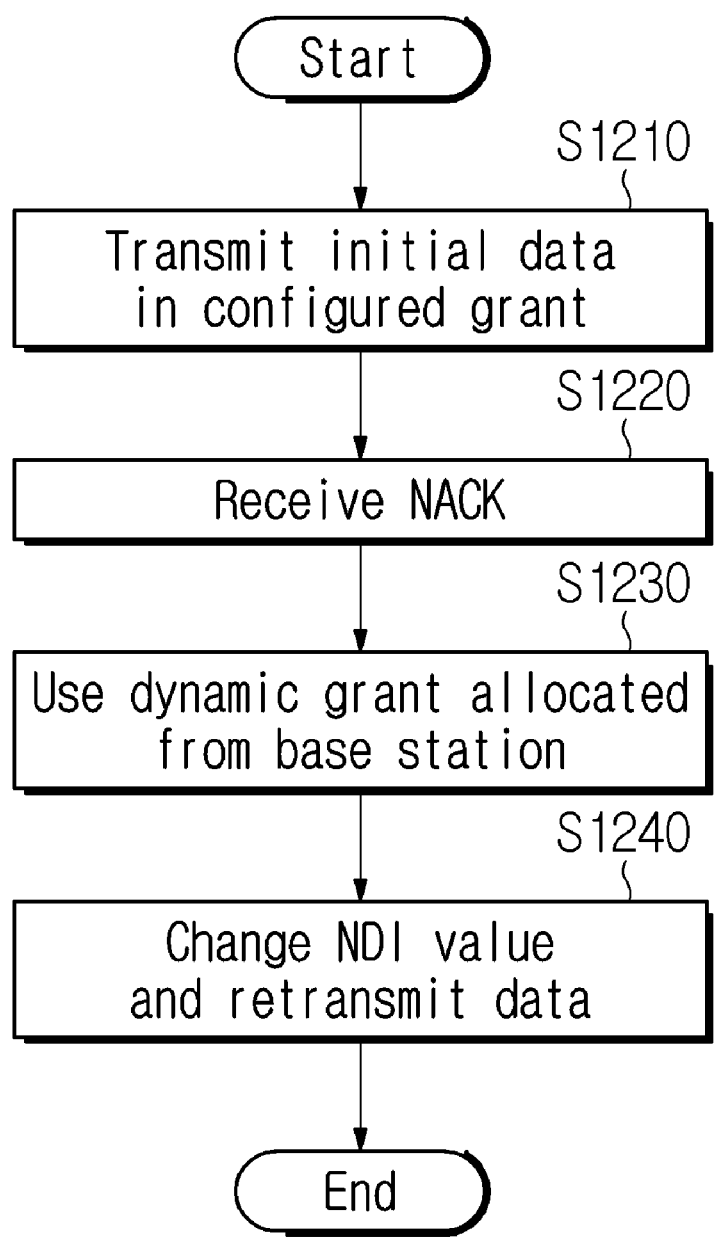
FIG. 12 is a flowchart illustrating a method of performing, by a UE, retransmission after performing initial data transmission in a configured grant according to the present disclosure.

FIG. 12 is a flowchart illustrating a method of performing, by a UE, retransmission after performing initial data transmission in a configured grant according to the present disclosure.

Referring to FIG. 12, In operation S1210, a Tx UE may transmit initial data in a configured grant. Here, when an Rx UE fails in receiving the data, the Rx UE may generate and transmit an HARQ-NACK message and the Tx UE transmitting the data and/or a base station may receive the NACK message in operation S1220. In operation 1230, a base station may allocate an SL grant to the Tx UE to support retransmission of the data and the Tx UE may perform data retransmission using the SL grant. In operation S1240, when performing data retransmission and configuring an NDI value in SCI, the Tx UE may maintain an existing NDI value as is without following an NDI value indicated by the base station.

Example 1-2. Use of Configured Grant for Retransmission

Here, as another example, a UE that receives an HARQ-NACK message may perform HARQ retransmission using a configured grant without using an SL grant.

A configured grant for an NR uplink may be used only for initial data transmission and data retransmission may be performed by receiving a dynamic allocated grant (UL grant) from a base station. Therefore, if there is no new data to be transmitted, the UE may not use a corresponding grant regardless of presence of the configured grant since the base station may determine whether to support retransmission into consideration of uplink radio quality when the base station receives initial data. In detail, even though the UE performs retransmission, the base station may determine to fail in receiving a packet due to poor uplink radio quality. In this case, the base station may not instruct HARQ retransmission. Alternatively, when it is determined that further packet retransmission is meaningless according to low latency requirements of a packet, the base station may not instruct the HARQ retransmission. That is, since the packet retransmission may be performed based on determination of the base station, the UE may perform only initial packet transmission through the configured grant and may perform retransmission according to instruction from the base station.

However, since a packet between UEs is not transmitted and received in a sidelink, the base station may be unaware of sidelink radio quality and the base station may not readily verify QoS requirements of the packet transmitted through the configured grant (SL configured grant). Therefore, it may be difficult for the base station to determine whether to support HARQ retransmission in the sidelink and to allocate an SL grant based on low latency requirements of the packet.

Accordingly, when HARQ retransmission is required, the UE may need to perform the HARQ retransmission without using an SL grant. In this case, the configured grant may need to be used for the HARQ retransmission. Here, only when new data transmission is not required through a corresponding HARQ process, the UE may use the sidelink configured grant. This operation may efficiently use a grant by using the configured grant being wasted.

Figure 13:
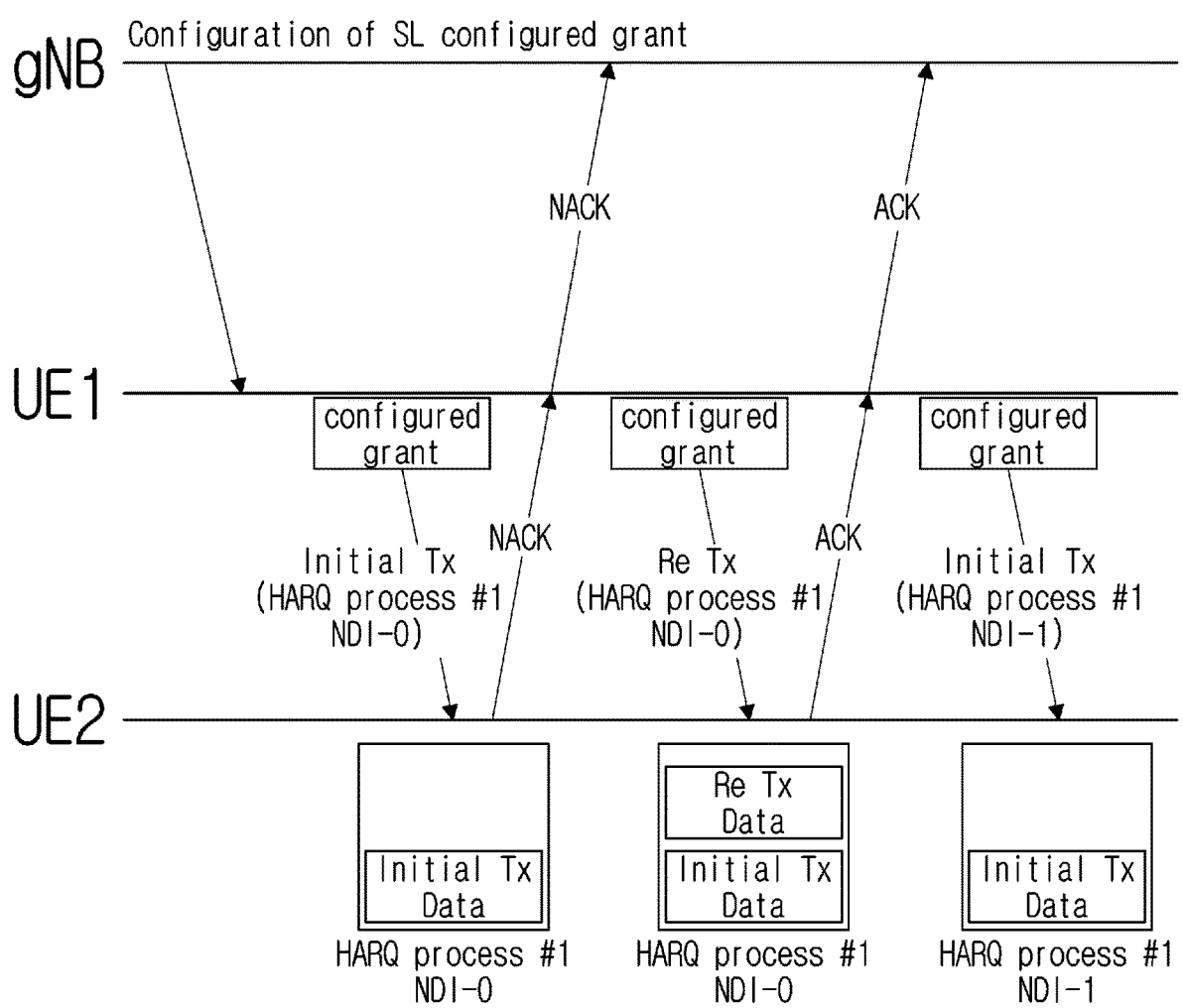
FIG. 13 illustrates an HARQ retransmission method using a configured grant according to the present disclosure.

FIG. 13 illustrates an HARQ retransmission method using a configured grant according to the present disclosure.

Referring to FIG. 13, as another example, a Tx UE (UE 1) may configure a configured grant (SL configured grant) through base station configuration. The Tx UE (UE 1) may perform initial data transmission for HARQ process #1 using the configured grant. For example, the Tx UE (UE 1) may set NDI and RV to 0, and may include the HARQ process ID, L1 ID including the NDI, and RV information in SCI and may transmit the same through a PSCCH. Next, the Tx UE (UE 1) may transmit related data corresponding to the SCI through a PSSCH.

An Rx UE (UE 2) that receives data according to the SCI may store the received data in an HARQ buffer for HARQ process ID #1 and may set the NDI to 0 and thereby consider the same as a packet initially received for the corresponding HARQ process. Next, when the Rx UE (UE 2) attempts to decode the data but fails in decoding the data, the Rx UE (UE 2) may generate and transmit HARQ-NACK feedback.

Here, the Tx UE (UE 1) that receives the HARQ-NACK message may transfer the HARQ-NACK message to the base station and may notify the base station of a failure of the corresponding packet transmission and may expect an SL dynamic allocated grant (SL grant) from the base station to perform HARQ retransmission.

However, the base station may be unaware of a sidelink radio situation and thus, may have difficulty in determining whether to perform retransmission of the packet. Therefore, regardless of a situation in which retransmission of the corresponding packet is required, the base station may not allocate an SL grant to the Tx UE (UE 1). Also, since it is difficult for the base station to verify QoS requirements for the corresponding packet, the base station may not schedule the SL grant as far as low latency requirements of the packet are met.

Accordingly, to outperform the above issue, if additional data to be transmitted is absent in a subsequent configured grant, the Tx UE (UE 1) may need to perform HARQ retransmission using the configured grant. That is, the Tx UE (UE 1) may meet low latency and high reliability requirements of a service by immediately performing HARQ retransmission using the configured grant without receiving the SL grant from the base station. Also, the Tx UE (UE1) may support efficient resource use by using the configured grant being wasted for the HARQ retransmission. Accordingly, when an HARQ process ID for the subsequent configured grant is identical to an existing HARQ process ID and, in this instance, there is no new data to be additionally transmitted using the configured grant, the Tx UE (UE 1) may perform HARQ retransmission in the configured grant. Here, the Tx UE (UE 1) may include the HARQ process ID, L1 ID including the NDI, and RV information in SCI and may transmit the same through a PSCCH. Here, the HARQ process ID may be set to 1, the NDI may be set to 0, which is identical to the existing NDI value, and the RV may be set to 2.

Here, the Rx UE (UE 2) may consider retransmission data as re-received data into consideration that the retransmission data is not togged based on NDI information in the SCI and may support a successful data reception by increasing a decoding success probability through combination with data stored in the corresponding HARQ buffer. Here, when the Rx UE (UE 2) succeeds in decoding the corresponding packet, the Rx UE (UE 2) may generate an HARQ-ACK message and may transmit the HARQ-ACK message to the Tx UE (UE 1).

The Tx UE (UE 1) that receives the HARQ-ACK message may transfer the message to the base station and may notify the base station that transmission of the corresponding packet is successfully completed.

That is, the aforementioned operation may meet low latency requirements of a unicast/groupcast service by performing HARQ retransmission although the UE does not additionally receive the SL grant from the base station.

Figure 14:
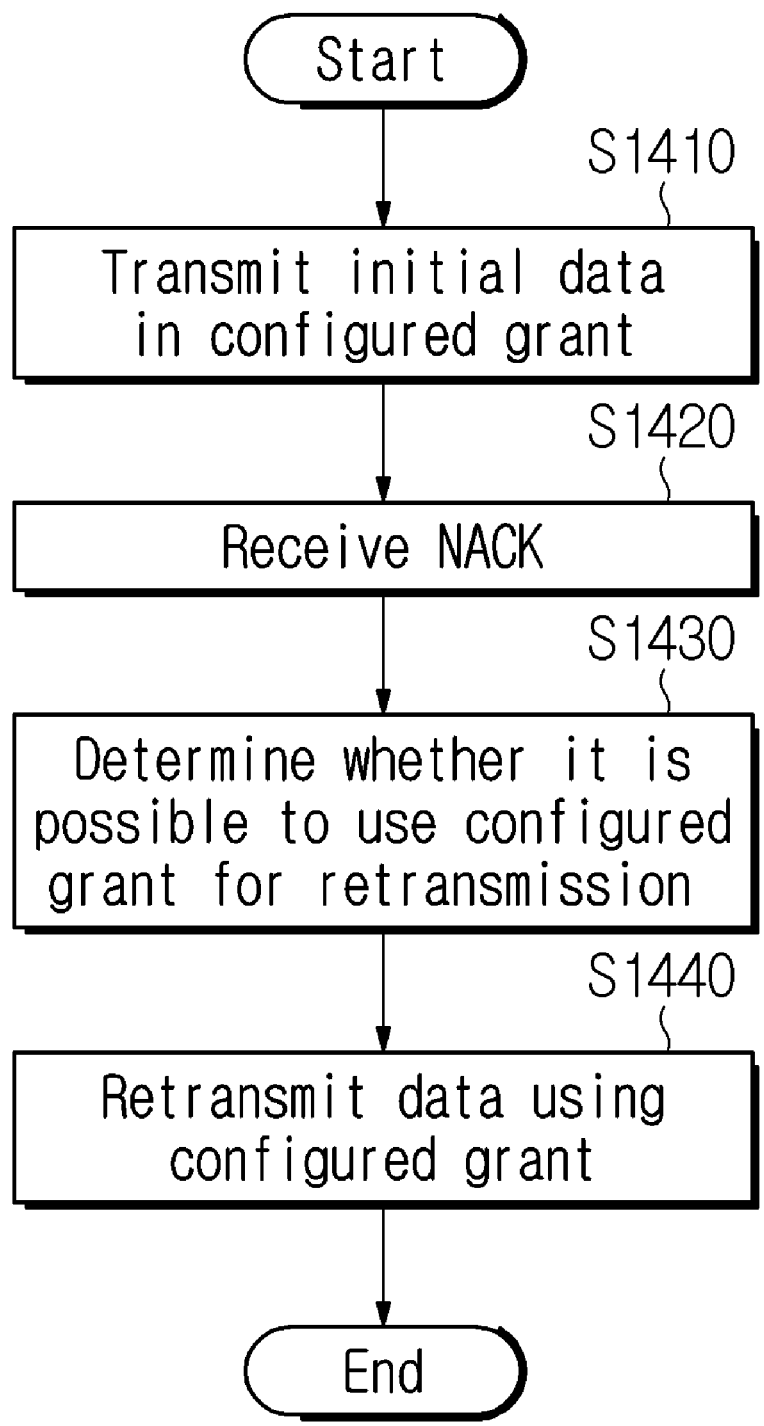
FIG. 14 is a flowchart illustrating a method of performing, by a UE, retransmission after performing initial data transmission in a configured grant according to the example.

FIG. 14 is a flowchart illustrating a method of performing, by a UE, retransmission after performing initial data transmission in a configured grant according to the example.

Referring to FIG. 14, in operation S1410, a V2X UE may transmit initial data in a configured grant. Here, when an Rx UE fails in receiving the data, the Rx UE may generate and transmit an HARQ-NACK message and the Tx UE transmitting the data may receive a NACK message in operation 51420. In operation 51430, the Tx UE may determine whether to perform HARQ retransmission in a subsequent configured grant depending on whether new data is present. For example, when additional data to be transmitted is absent in the subsequent configured grant, the Tx UE may perform HARQ retransmission using the configured grant in operation S1440.

Figure 15:
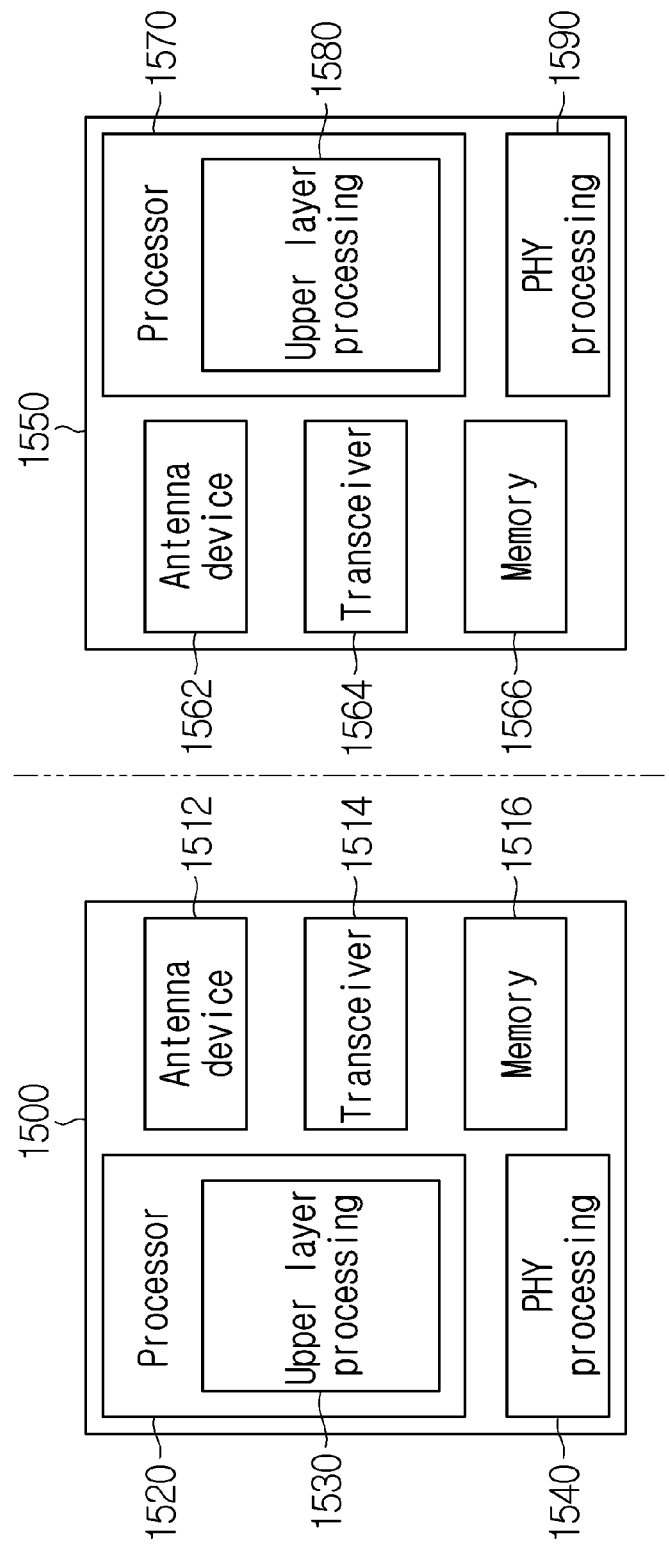
FIG. 15 is a diagram illustrating a configuration of a base station device and a terminal device according to the present disclosure.

FIG. 15 illustrates a configuration of a base station device and a terminal device according to the present disclosure.

A base station device 1500 may include a processor 1520, an antenna device 1512, a transceiver 1514, and a memory 1516.

The processor 1520 may perform baseband-related signal processing and may include an upper layer processing 1530 and a physical (PHY) processing 1540. The upper layer processing 1530 may process an operation (e.g., uplink received signal processing, downlink transmission signal processing, sidelink transmission signal processing, and sidelink received signal processing) of a PHY layer. The processor 1520 may also control the overall operation of the base station device 1500 in addition to performing the baseband-related signal processing.

The antenna device 1512 may include at least one physical antenna. When the antenna device 1512 includes a plurality of antennas, multiple input multiple output (MIMO) transmission and reception may be supported. The transceiver 1514 may include a radio frequency (RF) transmitter and an RF receiver. The memory 1516 may store operation processed information of the processor 1520, software, an operating system (OS), an application, etc., associated with an operation of the base station device 1500, and may include a component such as a buffer.

For example, the processor 1520 of the base station device 1500 according to the present invention may provide type 1 (configured grant type 1) to a terminal device 1550 through an RRC message as a configured sidelink grant and thereby set. Also, for example, the processor 1520 of the base station device 1500 may dynamically provide information about type 2 (configured grant type 2) as a configured sidelink grant to the terminal device 1550 through a PDCCH.

Also, for example, according to the present invention, the processor 1520 of the base station device 1500 may schedule a transmission resource about the terminal device 1550 based on a base station scheduling mode and may provide the scheduled transmission resource to the terminal device 1550, which is described above. Also, according to the present invention, the processor 1520 of the base station device 1500 may provide V2X related information to the terminal device 1550 through an RRC message. However, it is provided as an example only.

The terminal device 1550 may include a processor 1570, an antenna device 1562, a transceiver 1564, and a memory 1566.

The processor 1570 may perform baseband-related signal processing and may include an upper layer processing 1580 and a PHY processing 1590. The upper layer processing 1580 may process an operation of a MAC layer, an RRC layer, or more upper layers. The PHY processing 1590 may process an operation (e.g., downlink received signal processing, upper link transmission signal processing, sidelink transmission signal processing, and sidelink received signal processing) of a PHY layer. The processor 1570 may control the overall operation of the terminal device 1550 in addition to performing the baseband-related signal processing.

The antenna device 1562 may include at least one physical antenna. When the antenna device 1562 includes a plurality of antennas, MIMO transmission and reception may be supported. The transceiver 1564 may include an RF transmitter and an RF receiver. The memory 1566 may store operation processed information of the processor 1570 and software, an OS, an application, etc., associated with an operation of the terminal device 1550, and may include a component, such as a buffer.

The processor 1570 of the terminal device 1550 may be configured to implement an operation of a terminal in the examples described herein.

For example, according to an example of the present invention, the processor 1570 of the terminal device 1550 may perform data transmission using a configured grant. Also, for example, the processor 1570 of the terminal device 1550 may generate and transmit HARQ feedback. Also, for example, when performing data retransmission using a dynamic allocated resource for the configured grant, the processor 1570 of the terminal device 1550 may change HARQ information. For example, in response to a failure in data transmission for a configured grant, the processor 1570 of the terminal device 1550 may determine whether to perform HARQ retransmission in a subsequent configured grant, which is described above. Meanwhile, the processor 1570 of the terminal device 1550 may operate by receiving transmission resource information from a base station based on a base station scheduling mode.

Also, the description made above in the examples of the present invention may apply alike to operations of the base station device 1500 and the terminal device 1550 and a further description related thereto is omitted.

While the exemplary method of the present disclosure is described as a series of operations, for clarity of description, this does not limit the order of steps. When needed, the steps may be performed at the same time or in a different order. In order to implement the method according to the present disclosure, the exemplary method may further include additional steps, include the remaining steps except for some steps, or may include additional steps other than some steps.

The various examples herein are to explain the representative aspects of the present disclosure instead of describing all the possible combinations and matters described in the various examples may independently apply or may apply through at least two combinations thereof Also, various examples of the present disclosure may be implemented by hardware, firmware, software, or combination thereof. In the case of implementation by hardware, the examples may be implemented by one or more application-specific integrated circuits (ASICs), digital signal processors (DSPs), digital signal processing devices (DSPDs), programmable logic devices (PLDs), field programmable gate arrays (FPGAs), general processors, controllers, microcontrollers, microprocessors, etc.

The scope of the present disclosure includes software or machine-executable instructions (e.g., OS, application, firmware, program, etc.) such that operations of the method of the various examples may be executed on an apparatus or a computer, and a non-transitory computer-readable medium storing such software or instructions to be executable on an apparatus or a computer.

What is claimed is:

1. A method performed by a wireless user device, the method comprising:
   receiving, from a base station, first downlink control information (DCI) associated with a sidelink configured grant, wherein the first DCI comprises new data indicator (NDI) information of the first DCI;
   based on the sidelink configured grant, transmitting, from the wireless user device to a second wireless user device:
   sidelink control information (SCI) comprising a first value for NDI information of the SCI, wherein the first value for NDI information of the SCI is not based on the NDI information of the first DCI, and wherein the first value for NDI information of the SCI is configured to indicate:
   a new data transmission based on a second value used for NDI information of previous SCI, or
   a retransmission based on the first value used for NDI information of the previous SCI; and
   at least one packet;
   receiving, from the second wireless user device, a negative acknowledgment;
   receiving from the base station, second DCI associated with a sidelink grant for a retransmission of the at least one packet, wherein the second DCI comprises a configured value for NDI information of the second DCI, and wherein the configured value for NDI information of the second DCI is not based on the NDI information of the first DCI; and
   transmitting, to the second wireless user device and based on the second DCI associated with the sidelink grant, the first value for NDI information to indicate retransmission of the at least one packet to the second wireless user device.

2. The method of claim 1, wherein:
   the at least one packet is associated with the SCI;
   the SCI is transmitted via a first physical sidelink channel; and
   the at least one packet is transmitted via a second physical sidelink channel.

3. The method of claim 1, wherein the transmitting, to the second wireless user device and based on the sidelink grant, the first value for NDI information comprises:
   transmitting, to the second wireless user device and based on the sidelink grant:
   second SCI comprising the first value for NDI information; and
   the at least one packet.

4. The method of claim 3, wherein the first value comprised in the second SCI is determined based on:
   the sidelink grant; and
   the first value comprised in the SCI.

5. The method of claim 3, wherein the second SCI further comprises, for the retransmission of the at least one packet, at least one of:
   a layer-1 destination identifier (ID);
   a layer-1 source ID;
   a hybrid automatic repeat request (HARQ) process ID; or
   a redundancy version.

6. The method of claim 5, further comprising determining, based on HARQ information of the sidelink grant, at least one of:
   the HARQ process ID; or
   the redundancy version,
   wherein the first value, for NDI information, comprised in the second SCI is not determined based on the configured value, for NDI information, comprised in the second DCI associated with the sidelink grant.

7. The method of claim 5, wherein the second DCI associated with the sidelink grant comprises an HARQ process ID, and
   wherein the HARQ process ID comprised in the second DCI associated with the sidelink grant corresponds to the HARQ process ID comprised in the second SCI.

8. The method of claim 1, further comprising receiving third DCI comprising a second configured value for NDI information of the third DCI, wherein the second configured value is configured to indicate a dynamic sidelink grant for sidelink data, and wherein the configured value for NDI information of the second DCI is configured to indicate a sidelink configured grant different from the dynamic sidelink grant.

9. The method of claim 1, wherein the sidelink configured grant indicates a preconfigured sidelink resource, and
wherein the sidelink configured grant comprises at least one of:
a configured grant type 1 resource configured via a radio resource control (RRC) reconfiguration message; or
a configured grant type 2 resource configured via a physical downlink control channel (PDCCH).

10. The method of claim 1, further comprising:
transmitting, to the second wireless user device, second SCI comprising:
a second value for NDI information; and
at least one second packet,
wherein the second value is different from the first value for NDI information of the SCI to indicate that the at least one second packet is not a retransmission of sidelink data.

11. The method of claim 1, wherein the sidelink configured grant comprises at least one parameter for a hybrid automatic repeat request (HARQ) retransmission, and
wherein the negative acknowledgment is received via a physical sidelink feedback channel (PSFCH).

12. The method of claim 1, wherein a toggle of the configured value for NDI information of the second DCI neither indicates the retransmission of the at least one packet nor a new transmission.

13. A method performed by a wireless user device, the method comprising:
receiving, from a base station, first downlink control information (DCI) associated with a sidelink configured grant, wherein the first DCI comprises new data indicator (NDI) information of the first DCI;
based on the sidelink configured grant, transmitting, from the wireless user device to a second wireless user device:
first sidelink control information (SCI) comprising first new data indicator (NDI) information indicating a first value; and
sidelink data associated with the first SCI;
receiving, from the second wireless user device, a negative acknowledgment to the sidelink data;
receiving from the base station, second DCI associated with a sidelink grant for a retransmission of the sidelink data, wherein the second DCI comprises second NDI information indicating a configured value, wherein the configured value of the second DCI is not based on the NDI information of the first DCI; and
transmitting, to the second wireless user device and based on the second DCI associated with the sidelink grant:
second SCI comprising third NDI information indicating the first value, wherein the first value of the second SCI is based on the first value of the first SCI to indicate retransmission of the sidelink data to the second wireless user device; and
sidelink data associated with the second SCI.

14. The method of claim 13, wherein:
the sidelink data associated with the first SCI and the sidelink data associated with the second SCI comprise at least one packet,
wherein the configured value is different from the first value, and
wherein the first value corresponds to zero or one.

15. The method of claim 13, wherein the third NDI information is determined based on:
the sidelink grant; and
the first NDI information.

16. The method of claim 13, wherein the second SCI further comprises at least one of:
a layer-1 destination identifier (ID);
a layer-1 source ID;
a hybrid automatic repeat request (HARQ) process ID; or
a redundancy version.

17. The method of claim 16, further comprising determining, based on HARQ information of the sidelink grant, at least one of:
the HARQ process ID; or
the redundancy version,
wherein the third NDI information is not determined based on the second NDI information.

18. The method of claim 16, wherein the sidelink grant comprises an HARQ process ID, and
wherein the HARQ process ID comprised in the sidelink grant corresponds to the HARQ process ID comprised in the second SCI.

19. The method of claim 13, wherein the sidelink configured grant indicates a preconfigured sidelink resource, and
wherein the sidelink configured grant comprises at least one of:
a configured grant type 1 resource configured via a radio resource control (RRC) reconfiguration message; or
a configured grant type 2 resource configured via a physical downlink control channel (PDCCH).

20. The method of claim 13, further comprising:
transmitting, to the second wireless user device, third SCI comprising:
fourth NDI information indicating a second value; and
sidelink data associated with the third SCI,
wherein the second value is different from the first value, and
wherein the sidelink data associated with the third SCI is not a retransmission of sidelink data.

21. The method of claim 13, wherein a toggle of the configured value of the second DCI neither indicates the retransmission of the sidelink data nor a new transmission.

* * * * *